United States Patent
Yokono et al.

(10) Patent No.: US 7,369,686 B2
(45) Date of Patent: May 6, 2008

(54) ROBOT APPARATUS, FACE RECOGNITION METHOD, AND FACE RECOGNITION APPARATUS

(75) Inventors: Jun Yokono, Tokyo (JP); Kohtaro Sabe, Tokyo (JP); Kenta Kawamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 433 days.

(21) Appl. No.: 10/399,740

(22) PCT Filed: Aug. 21, 2002

(86) PCT No.: PCT/JP02/08433

§ 371 (c)(1),
(2), (4) Date: Dec. 23, 2003

(87) PCT Pub. No.: WO03/019475

PCT Pub. Date: Mar. 6, 2003

(65) Prior Publication Data

US 2005/0036649 A1    Feb. 17, 2005

(30) Foreign Application Priority Data

Aug. 23, 2001  (JP) ............................. 2001-253700

(51) Int. Cl.
*G06K 9/00* (2006.01)
(52) U.S. Cl. .................................................. 382/118
(58) Field of Classification Search ............... 382/118, 382/224, 190
See application file for complete search history.

(56) References Cited

U.S. PATENT DOCUMENTS 6,421,463 B1 *  7/2002  Poggio et al. ............... 382/224

(Continued)

FOREIGN PATENT DOCUMENTS

CN       1302 056       7/2001

(Continued)

OTHER PUBLICATIONS

Edgar Osuna, Robert Freund, Federico Girosi, "Training Support Vector Machines: an Application to Face Detection," cvpr, p. 130, 1997 IEEE Computer Society Conference on Computer Vision and Pattern Recognition (CVPR'97), 1997.*

(Continued)

*Primary Examiner*—Bhavesh M. Mehta
*Assistant Examiner*—Hadi Akhavannik
(74) *Attorney, Agent, or Firm*—Frommer Lawrence & Haug LLP; William S. Frommer; Thomas F. Presson

(57) ABSTRACT

A robot includes a face extracting section for extracting features of a face included in an image captured by a CCD camera, and a face recognition section for recognizing the face based on a result of face extraction by the face extracting section. The face extracting section is implemented by Gabor filters that filter images using a plurality of filters that have orientation selectivity and that are associated with different frequency components. The face recognition section is implemented by a support vector machine that maps the result of face recognition to a non-linear space and that obtains a hyperplane that separates in that space to discriminate a face from a non-face. The robot is allowed to recognize a face of a user within a predetermined time under a dynamically changing environment.

9 Claims, 26 Drawing Sheets

U.S. PATENT DOCUMENTS

| | | | |
|---|---|---|---|
| 6,983,065 B1 * | 1/2006 | Akgul et al. | 382/141 |
| 7,035,467 B2 * | 4/2006 | Nicponski | 382/224 |
| 2001/0020837 A1 | 9/2001 | Yamashita et al. | |

FOREIGN PATENT DOCUMENTS

| | | |
|---|---|---|
| EP | 1 083 120 | 3/2001 |
| JP | 11-53525 | 2/1999 |
| JP | 2000-507726 | 6/2000 |
| JP | 2001-208524 | 8/2001 |
| JP | 2002-511620 | 4/2002 |
| WO | WO 97/37326 | 10/1997 |
| WO | WO 99/53443 | 10/1999 |
| WO | WO 00/53281 | 9/2000 |

OTHER PUBLICATIONS

Abstractplus for "A Gabor Feature classifier for face recognition". The paper is published by Chengjun Liu et al.*

Abstractplus for "Face recognition with support vector machines: global versus component based approach". The paper is published by Heisle et al.*

Kah-Kay Sung, Tomaso Poggio, "Example-Based Learning for View-Based Human Face Detection," IEEE Transactions on Pattern Analysis and Machine Intelligence, vol. 20, No. 1, pp. 39-51, Jan. 1998.*

Weston, J., Muckerjee, S., Chapelle, O., Pontil, M., Poggio, T., & Vapnik, V. (2000). Feature selection for SVMs. In Proceedings of NIPS 2000, to appear.*

Chengjun Liu et al: "A gabor feature classifier for face recognition" Proc. Int. Conf. on Computer Vision, vol. 2, Jul. 7, 2001, pp. 270-275, XP010554098.

Heisele B et al: "Face recognition with support vector machines: global versus component-based approach" Proc. Int. Conf. On Computer Vision, vol. 2, Jul. 7, 2001, pp. 688-694, XP010554156.

Zhang Z: "Feature-Based Facial Expression Recognition Sensitivity Analysis and Experiments With a Multilayer Perceptron" International Journal of Pattern Recognition and Artificial Intelligence, World Scientific Publishing Company, Singapore, SI, vol. 13, No. 6, Sep. 1999, pp. 893-911, XP000854242 ISSN: 0218-0014.

P. Jonathon Phillips, Support Vector Machines Applied to Face Recognition., To appear in Proceedings of Neural Information Processing 98, 1999. 02.24, PB-99-102667, p. 1-9.

* cited by examiner

| node 100 | INPUT-EVENT NAME | DATA NAME | DATA RANGE | PROBABILITIES Di OF TRANSITION TO OTHER NODES | | | | | n |
|---|---|---|---|---|---|---|---|---|---|
| | | | | A | B | C | D | | |
| TRANSITION DESTINATION NODE | | | | node120 | node 120 | node 1000 | | | node 600 |
| OUTPUT ACTION | | | | ACTION 1 | ACTION 2 | MOVE BACK | | | ACTION 4 |
| 1 | BALL | SIZE | 0.1000 | 30% | | | | | |
| 2 | PAT | | | | 40% | | | | |
| 3 | HIT | | | | 20% | | | | |
| 4 | MOTION | | | | | 50% | | | |
| 5 | OBSTACLE | DISTANCE | 0.100 | | | 100% | | | |
| 6 | | JOY | 50.100 | | | | | | |
| 7 | | SURPRISE | 50.100 | | | | | | |
| 8 | | SUDNESS | 50.100 | | | | | | |

FIG. 10

ROBOT APPARATUS, FACE RECOGNITION METHOD, AND FACE RECOGNITION APPARATUS

TECHNICAL FIELD

The present invention relates to a robot apparatus provided with a human interface, capable of responding within a predetermined time under a dynamically changing operating environment, and to a face recognition method and face recognition apparatus that can be used as a human interface for a robot, and the present invention relates to a robot apparatus, a face recognition method, and a face recognition apparatus that allow recognition of a face of a user within a predetermined time under a dynamically changing operating environment.

More specifically, the present invention relates to a robot apparatus, a face recognition method, and a face recognition apparatus that do not require positioning such as morphing and that allow robust face recognition against rotation and change in position and the like, and in particular, the present invention relates to a robot apparatus, a face recognition method, and a face recognition apparatus that allow robust face recognition under environments with different lighting conditions-or camera parameters.

BACKGROUND ART

Techniques of face recognition can be widely applied to man-machine interfaces, for example, for a personal authentication system that does not impose a burden on users, and for distinction of gender. Although recognition techniques based on side faces have been considered initially, recognition techniques based on front images are now most common.

Researches on face recognition are considered as benchmarks for verifying theories of pattern recognition, and thus various methods there of face recognition have been developed. Most applications assumed in the development, such as authentication in security systems, and search for a person from a large-scale database, have required accuracy under static environments.

Recently, robot apparatuses for entertainment, with appearances similar to those of animals such as dogs, have been available. For example, on Nov. 25, 2000, Sony Corporation announced "SDR-3X", which is a two-legged mobile humanoid robot. Legged mobile robots of this type are unstable and it is difficult to control attitude and gait thereof; however, advantageously, the robots are allowed to go up and down stairs or ladders and to overcome obstacles, achieving flexible walking and running irrespective of distinction between leveled and unleveled grounds. Furthermore, with improved intelligence that allows robots to operate autonomously, it becomes not impossible for people and robots to live together in the same living space.

Intelligent robot apparatuses are capable of exhibiting animal-like behavior by autonomously operating eyes and legs in accordance with external information (e.g., information regarding circumstances), internal status (e.g., emotional status), etc.

The emergence of such robot apparatuses raised demand for human interface techniques that allow response within a predetermined time under a dynamically changing operating environment, one of which is face discrimination by a robot apparatus. For example, by using face discrimination, a robot apparatus is allowed to discriminate a user (owner, friend, or legitimate user) from among many, and a higher level of entertainment is achieved, for example, by changing reactions on the basis of individual users.

Techniques of face recognition in robot apparatuses, as opposed to applications to authentication in security systems and search for a person from a large-scale database, require response within a predetermined time under a dynamically changing operating environment even at the cost of somewhat less accuracy.

An application of face discrimination in such a robot apparatus needs to solve the following problems in addition to the problem of discriminating a person from a given scene.

(1) Since the robot apparatus itself moves, change in and diversity of environment must be accepted.
(2) Since the relative positions of a person and the robot apparatus change, the person must be kept in vision during interactions.
(3) An image that is useful for discrimination of a person must be selected from a large number of scenes, and a comprehensive judgment must be made.
(4) A response must take place within a predetermined time.

The mainstream of face recognition methods has been methods based on neural network and methods in which principal components analysis (PCA) is applied to a vector space composed of luminance values of a face image (eigenspace method). These conventional methods, however, have had the following shortcomings.

First, face recognition based on neural network does not allow incremental learning.

As for the methods based on eigenspace, although orthogonal piecewise-linear spaces are assumed (i.e., averaging two face images forms a human face), linearity is not actually provided in many cases, so that precise positioning called morphing or alignment is required. Some methods attempt to alleviate the effect by normalization with respect to position, rotation, and size in the pre-process; however, the processing does not necessarily work well. This has been a factor that deteriorates recognition performance. Furthermore, since the degrees of face space are significantly reduced to allow separation in that space, features of high degrees might be lost.

Furthermore, each of the recognition methods described above is susceptible to effects of change in lighting conditions, change in camera parameters, noise, position, and rotation, so that pre-processing such as noise filtering and morphing is required. Also, question remains regarding the ability of generalization.

DISCLOSURE OF INVENTION

It is an object of the present invention to provide a robot apparatus provided with a human interface that allows response within a predetermined time under a dynamically changing operating environment, and a favorable face recognition method and face recognition apparatus that can be used as a human interface for a robot.

It is another object of the present invention to provide a favorable robot apparatus, face recognition method, and face recognition apparatus that allow recognition of a face of a user within a predetermined time under a dynamically changing operating environment.

It is another object of the present invention to provide a favorable robot apparatus, face recognition method, and face recognition apparatus that allow robust face recognition under environments with different lighting conditions and camera parameters.

It is another object of the present invention to provide a favorable robot apparatus, face recognition method, and face recognition apparatus that do not require positioning such as morphing and that allow robust face recognition against rotation, change in position, and the like.

It is another object of the present invention to provide a favorable robot apparatus, face recognition method, and face recognition apparatus that do not require positioning such as morphing and that allow robust face recognition against rotation, change in position, and the like.

The present invention has been made in consideration of the above objects. The present invention, in a first aspect thereof, is a robot apparatus that operates autonomously, comprising image input means for inputting a face image;

facial feature extraction means for extracting features of the face image using a plurality of filters that have orientation selectivity and that are associated with different frequency components; and face discrimination means for discriminating a particular face from other faces by non-linearly mapping, using a kernel function, the facial features extracted by the facial feature extraction means and by obtaining a hyperplane that separates in a feature space obtained by the mapping.

The facial feature extraction means may be implemented by Gabor filters, and the face discrimination means may be implemented by a support vector machine.

According to the first aspect of the present invention, the robot apparatus does not require positioning such as morphing for the input image, allowing robust face recognition against rotation and change in position and the like. That is, the robot apparatus is allowed to recognize faces of users within a predetermined time under a dynamically changing operating environment, and to respond in real time to individual users.

The facial feature extraction means may comprise filter changing means for changing type of the Gabor filters in accordance with recognition task.

Also, the facial feature extraction means, in filtering at a low frequency, may downsample a filtered image to reduce dimension of the filtered image. Downsampled vectors are arranged in a line to form a long vector, which is supplied to the face recognition means at a subsequent stage.

The present invention, in a second aspect thereof, is a face recognition apparatus or face recognition method comprising:

image input means or step for inputting a face image;

facial feature extraction means or step for extracting features of the face image using a plurality of filters that have orientation selectivity and that are associated with different frequency components; and face discrimination means or step for discriminating a particular face from other faces by non-linearly mapping, using a kernel function, the facial features extracted by the facial feature extraction means or step and by obtaining a hyperplane that separates in a feature space obtained by the mapping.

The facial feature extraction means may be implemented by Gabor filters, and the face discrimination means may be implemented by a support vector machine.

By the face recognition apparatus or face recognition method according to the second aspect of the present invention, without requiring positioning such as morphing for the input image, robust face recognition against rotation and change in position and the like is allowed. That is, recognition of a face of a user is allowed within a predetermined time even under a dynamically changing operating environment. By using the face recognition apparatus or face recognition method according to the second aspect of the present invention in a robot apparatus, the robot apparatus is allowed, for example, to take different reactions on the basis of individual users without delay, achieving a higher level of entertainment.

The facial feature extraction means or step may comprise filter changing means or step for changing type of the Gabor filters in accordance with recognition task.

Also, the facial feature extraction means or step, in filtering at a low frequency, may downsample a filtered image to reduce dimension of the filtered image. Downsampled vectors are arranged in a line to form a long vector, which is supplied to the face recognition means or step at a subsequent stage.

Other objects, features, and advantages of the present invention will be made apparent by detailed descriptions based on embodiments of the present invention, described later, and attached drawings.

BRIEF DESCRIPTION OF THE DRAWINGS

FIG. 10 is a diagram showing a state transition table provided for each of nodes NODE0 to NODEn constituting the own action models 170-1 to 170-n.

BEST MODE FOR CARRYING OUT THE INVENTION

Now, embodiments of the present invention will be described with reference to the drawings.

In an embodiment of the present invention, described below, the present invention is applied to a two-legged mobile robot apparatus having a human-like external shape, i.e., a humanoid robot. However, the present invention, in its essence, is not limited thereto, and may be similarly applied, for example, to a four-legged mobile robot such as a dog robot.

The robot apparatus according to this embodiment exhibits behavior with reality by autonomously operating eyes, legs, etc. in accordance with external information (e.g., information regarding circumstances) and internal status (e.g., emotional status). The robot apparatus has the capability of recognizing faces, which serves as a human interface, to allow discrimination of faces of users (friends or owners) or the like, taking different reactions on the basis of individual users based on results of face recognition.

A. Construction of the Robot

Figure 1:
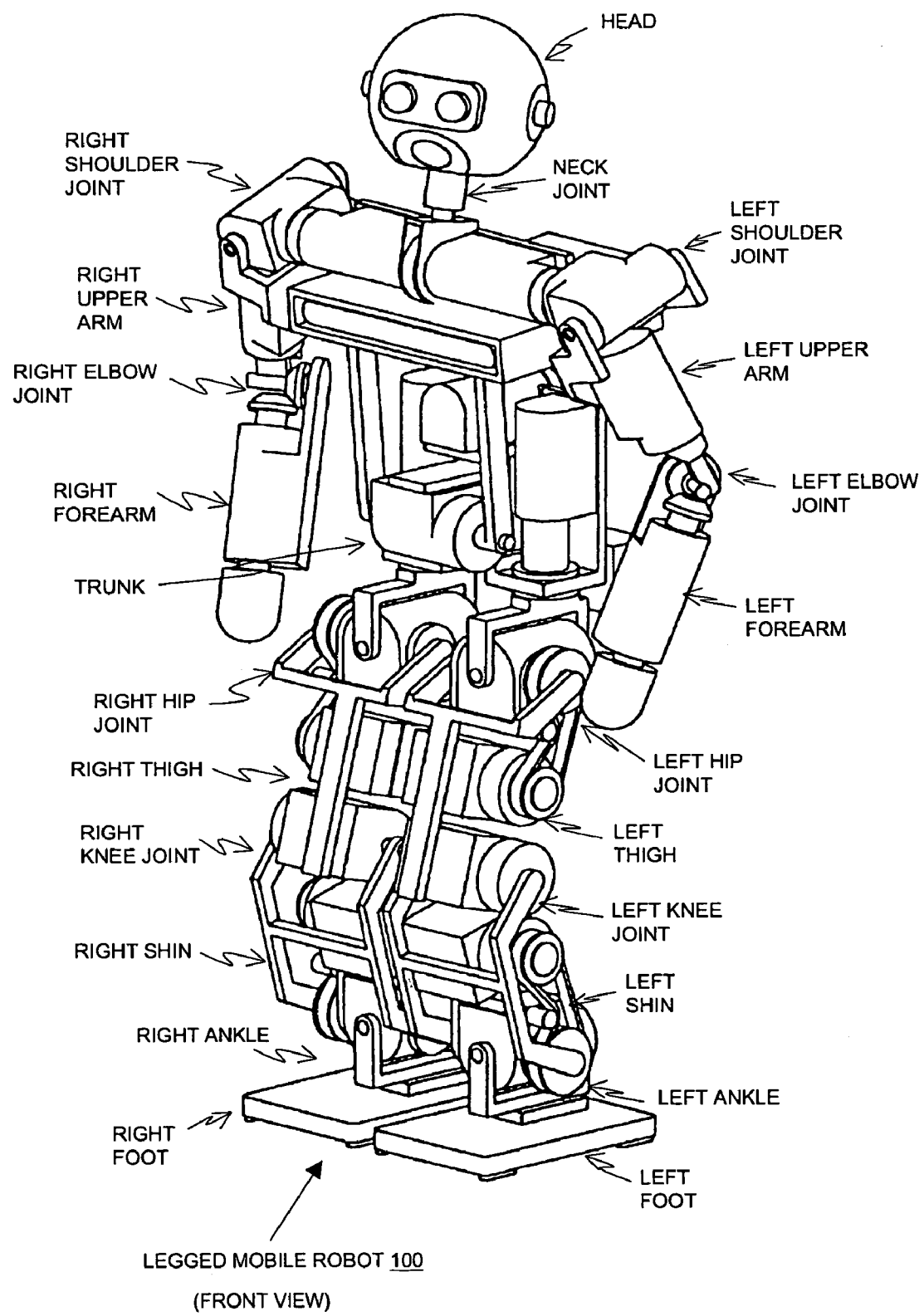
FIG. 1 is a diagram showing a legged mobile robot 100 according to an embodiment of the present invention, as viewed from the front.
Figure 2:
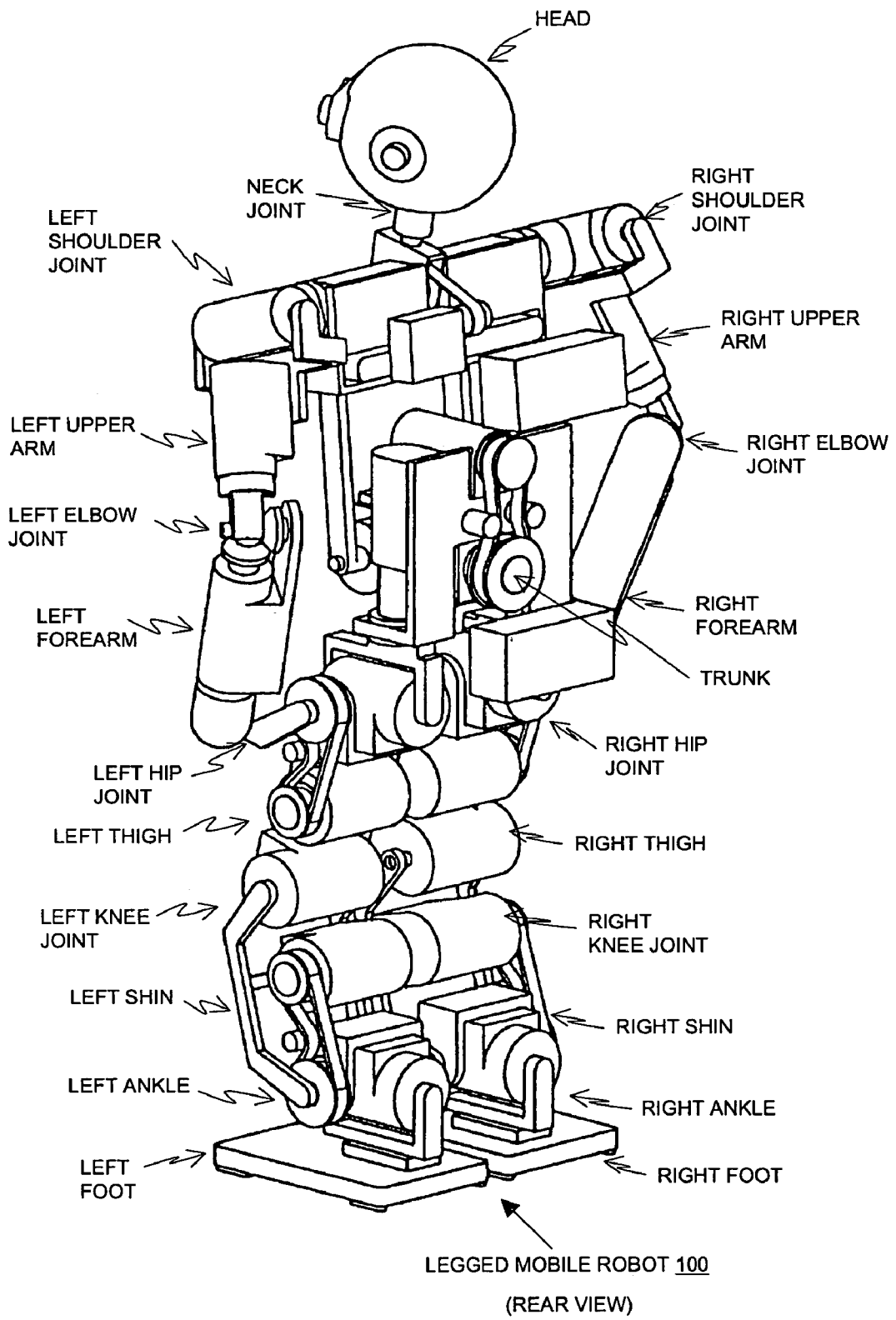
FIG. 2 is a diagram showing the legged mobile robot 100 according to the embodiment of the present invention, as viewed from the back.
Figure 3:
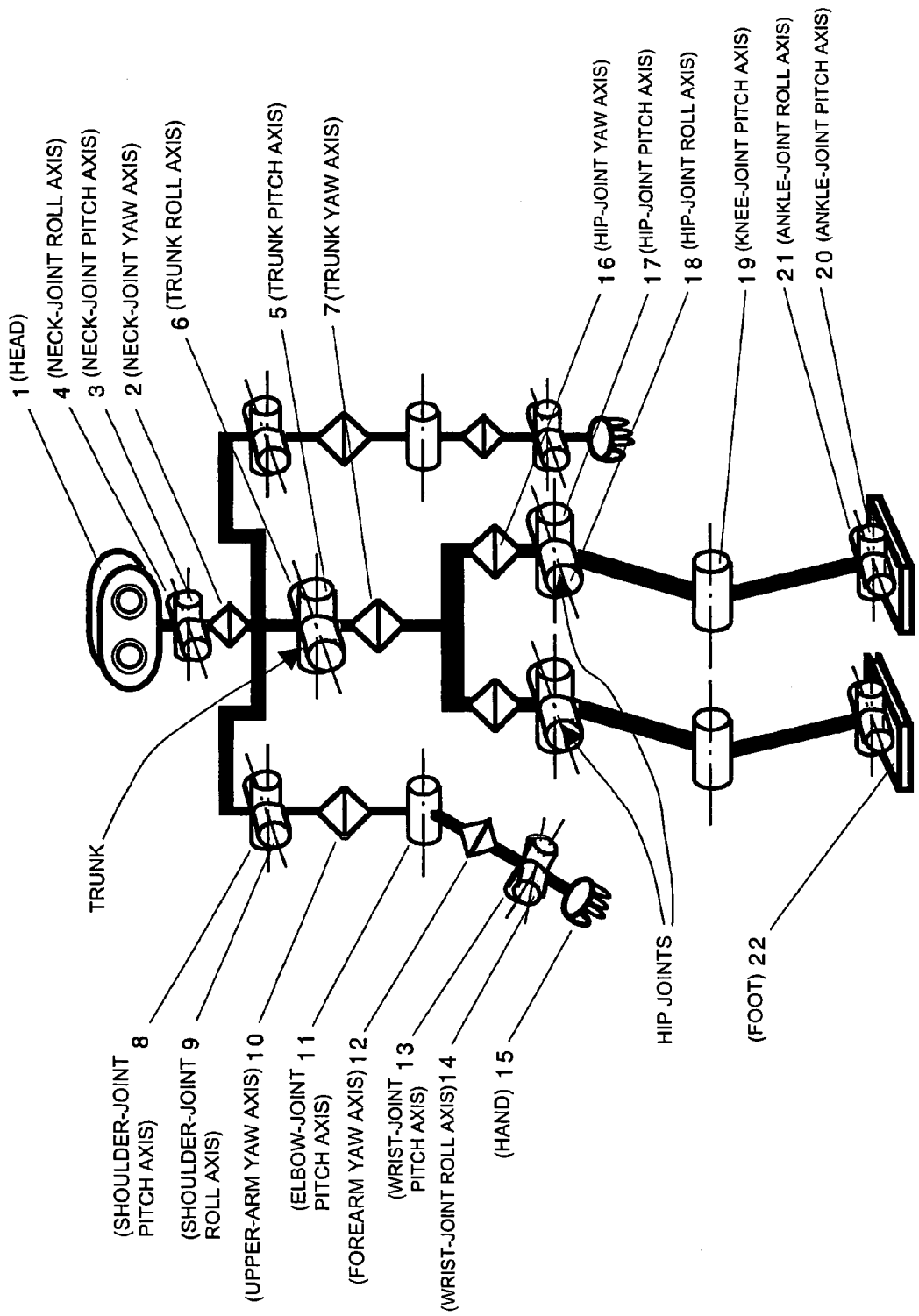
FIG. 3 is a schematic diagram showing the configuration of degrees of freedom in the legged mobile robot 100 according to the embodiment.

FIGS. 1 and 2 show a legged mobile robot 100 according to this embodiment, as viewed from front and rear, respectively. FIG. 3 schematically shows the degrees of freedom of joints of the legged mobile robot 100.

As shown in FIG. 3, the legged mobile robot 100 is a structure with a plurality of limbs, having an upper limb including two arms and a head 1, a lower limb including two legs that allow movement, and a trunk connecting the upper limb and the lower limb.

A neck joint supporting the head 1 has three degrees of freedom, namely, a neck-joint yaw axis 2, a neck-joint pitch axis 3, and a neck-joint roll axis 4.

Each of the arms has a shoulder-joint pitch axis 8, a shoulder-join roll axis 9, an upper-arm yaw axis 10, an elbow-joint pitch axis 11, a forearm yaw axis 12, a wrist-joint pitch axis 13, a wrist-joint roll axis 14, and a hand 15. The hand 15 is actually a structure including a plurality of fingers, thus having multiple joints and multiple degrees of freedom. The operation of the hand 15, however, does not significantly contribute to or affect attitude control or gait control of the robot 100, and thus the degrees of freedom of the hand 15 is assumed to be zero in this specification. Thus, each of the arms is assumed to have seven degrees of freedom.

The trunk has three degrees of freedom, namely, a trunk pitch axis 5, a trunk roll axis 6, and a trunk yaw axis 7.

Each of the legs constituting the lower limb has a hip-joint yaw axis 16, a hip-joint pitch axis 17, a hip-joint roll axis 18, a knee-joint pitch axis 19, an ankle-joint pitch axis 20, an ankle-joint roll axis 21, and a foot 22. In this specification, the intersection between the hip-joint pitch axis 17 and the hip-joint roll axis 18 defines the position of a hip joint of the legged mobile robot 100 according to this embodiment. Although the foot 22 of a human is actually a structure including a foot having multiple joints and multiple degrees of freedom, a foot of the legged mobile robot 100 according to this embodiment has zero degrees of freedom. Thus, each of the legs has six degrees of freedom.

To sum up, the legged mobile robot 100 according to this embodiment, as a whole, has 3+7×2+3+6×2=32 degrees of freedom in total. The degrees of freedom of the legged mobile robot 100 for entertainment, however, is not necessarily limited to 32. It is to be understood that the degrees of freedom, i.e., the number of joints, may be increased or decreased as appropriate in accordance with constraints and required specifications in design and manufacturing.

The degrees of freedom of the legged mobile robot 100, described above, are implemented by actuators. In consideration of requirements for simulating the appearance of a natural shape of a human without excessive bulk and for controlling the attitude of an unstable structure that walks with two legs, the actuators are preferably small in size and light in weight. In this embodiment, small-sized AC servo actuators, each directly connected to a gear and including a single-chip servo control system incorporated in a motor unit, are used. An AC servo actuator of this type is disclosed, for example, in Japanese Unexamined Patent Application Publication No. 2000-299970 (Japanese Patent Application No. 11-33386) assigned to the applicant of this application.

Figure 4:
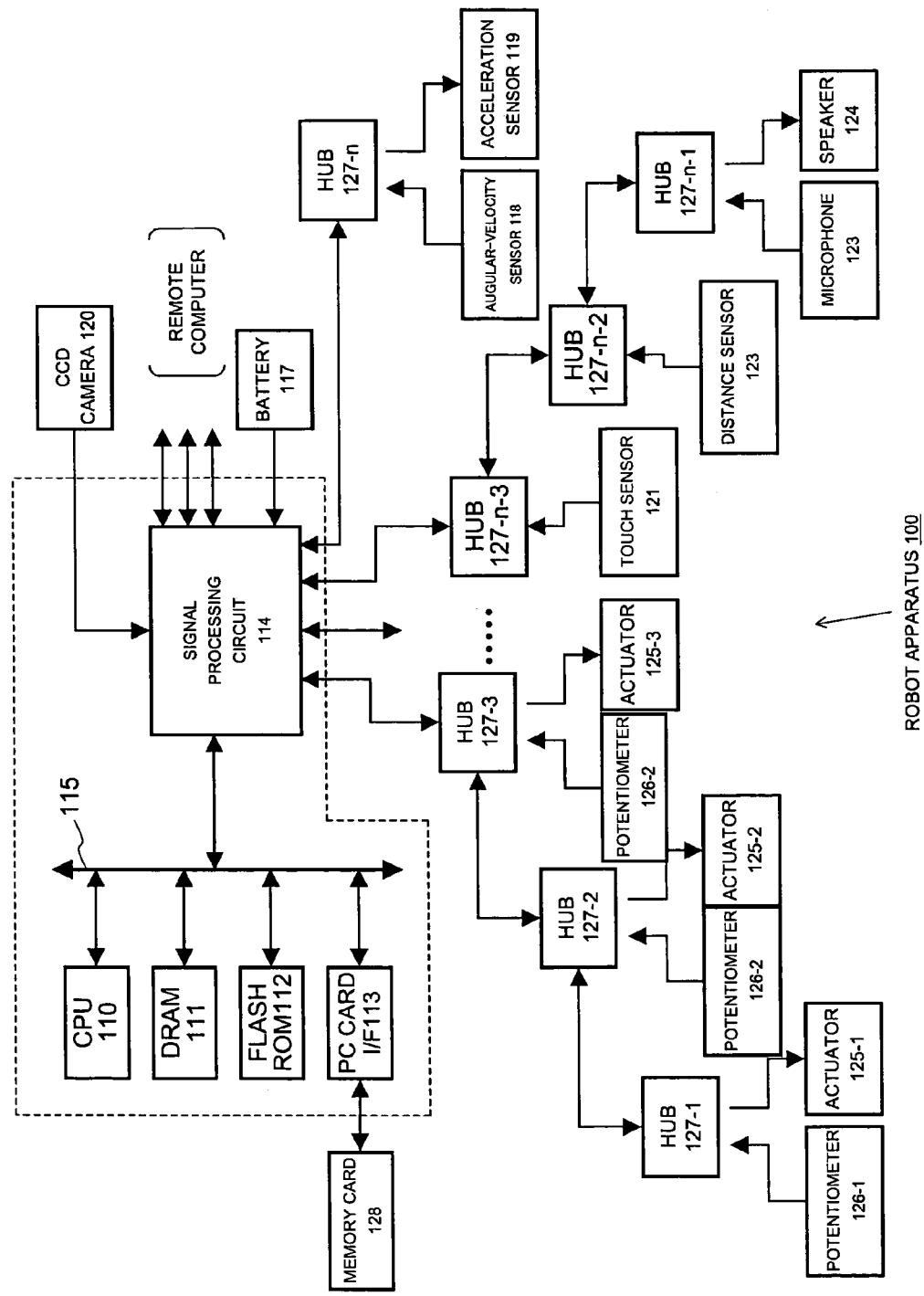
FIG. 4 is a schematic diagram showing the configuration of a control system of the legged mobile robot 100.

FIG. 4 schematically shows the configuration of a control system of the legged mobile robot 100. The control system includes a controller 116 and a battery 117 that serves as a power source for the robot apparatus 100, and is mounted, for example, in the apparatus body or at the back of the legged mobile robot. The controller 116 includes a CPU (central processing unit) 110, a DRAM (dynamic random access memory) 111, a flash ROM (read-only memory) 112, a PC (personal computer) card interface circuit 113, and a signal processing circuit 114, connected to each other via an internal bus 115. The apparatus includes an angular velocity sensor 118, an acceleration sensor 119, etc., for detecting an orientation and an acceleration of movement of the robot apparatus 100.

The head of the apparatus includes a CCD (charge coupled device) camera 120 for imaging external status, a touch sensor 121 for detecting a pressure exerted by a physical operation by a user, such as "stroking" or "striking", a distance sensor 122 for measuring a distance to a target located in front, a microphone 123 for collecting external sound, a speaker 124 for outputting sound such as an animal voice, etc., disposed at predetermined positions of the apparatus. The CCD camera 120 functions as image input means for capturing a face image in face discrimination.

Furthermore, at the joints of the leg units, the connecting parts between the leg units and the body unit, and the connecting part between the head unit and the body unit, etc., actuators 125-1 to 125-$n$ and potentiometers 126-1 to 126-$n$ in accordance with their respective degrees of freedom are provided. For example, the actuators 125-1 to 125-$n$ are respectively implemented by single servo motors. The leg units are driven and controlled by the servo motors to transit to a target attitude or operation.

The various sensors described above, including the angular velocity sensor 118, the acceleration sensor 119, the touch sensor 121, the distance sensor 122, the microphone 123, the speaker 124, and the potentiometers 126-1 to 126-$n$, and the actuators 125-1 to 125-$n$ are concentrated to associated hubs 127-1 to 127-$n$, respectively, and thereby connected to the signal processing circuit 114 of the controller 116. The CCD camera 120 and the battery 117 are directly connected to the signal processing circuit 114.

The signal processing circuit 114 sequentially captures sensor data, image data, and audio data supplied from the sensors described above, and stores these data as required at specified addresses in the DRAM 111 via the internal bus 115. Furthermore, the signal processing circuit 114 sequentially captures remaining-battery data indicating a remaining battery capacity, supplied from the battery 117, and similarly stores the data at a specified address in the DRAM 111.

The sensor data, image data, audio data, and remaining-battery data stored in the DRAM 111 as described above are subsequently available to the CPU 110 in controlling operation of the robot apparatus 100.

Actually, initially when the robot apparatus 100 is powered on, the CPU 110 reads a control program stored in a memory card 128 placed in a PC card slot, not shown, of the body unit 2 or stored in the flash ROM 112, via the PC card interface circuit 113 or directly, and loads the control program in the DRAM 111.

After loading the program, the CPU 110 judges its own status and circumstances of the apparatus, whether an instruction or operation has been made by a user, etc., based on the sensor data, image data, audio data, and remaining-battery data sequentially stored in the DRAM 111 from the signal processing circuit 114 as described earlier.

Furthermore, the CPU 110 determines a subsequent action based on results of the judgments and the control program loaded in the DRAM 111, and drives the actuators 125-1 to 125-$n$ as required based on a result of the determination, thereby swinging the head left and right or driving the leg units to execute a leg operation such as walking.

In executing the program, the CPU 110 generates audio data as required, and supplies the audio data to the speaker 24 via the signal processing circuit 114 as an audio signal, thereby outputting a sound based on the audio signal to the outside.

As described above, the robot apparatus 100 is arranged to autonomously behave in accordance with its own status and circumstances and instructions and operations by a user.

B. Software Configuration of Control Program

Figure 5:
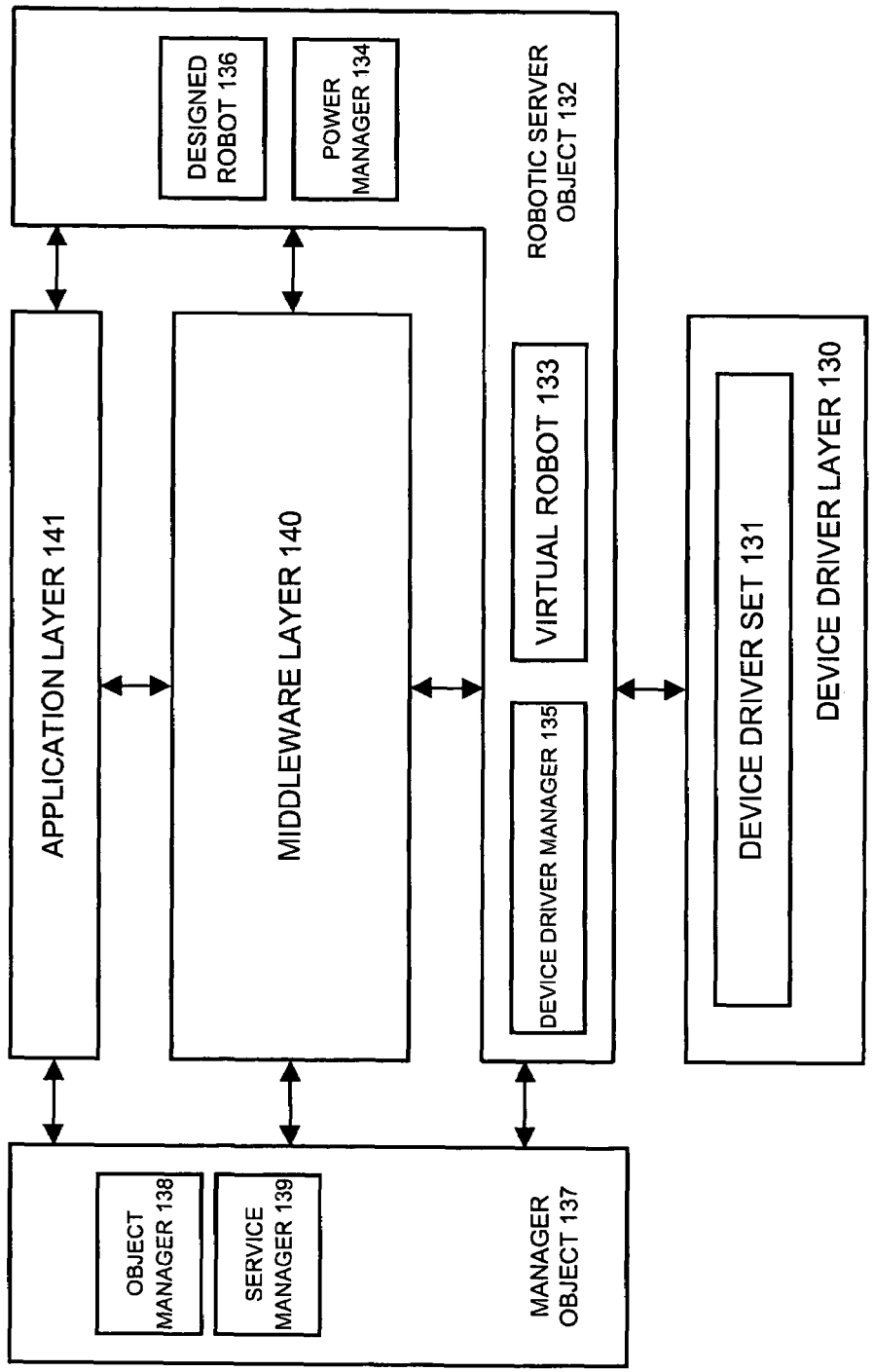
FIG. 5 is a schematic diagram showing the software configuration of a control program for implementing processing operations of the robot apparatus 100 according to the embodiment.

FIG. 5 schematically shows the software configuration of the control program for implementing processing operations of the robot apparatus 100 according to this embodiment.

As shown in the figure, a device driver layer 130 resides in a lowermost layer of the control program, and it includes a device driver set 31 constituted of a plurality of device drivers. Each of the device drivers herein is an object that is allowed to directly access hardware used for ordinary computer processing, such as the CCD camera 20 (refer to FIG. 4) or a timer, and typically it starts processing in response to an interrupt by relevant hardware (interrupt handler).

A robotic server object 132 resides in a lowermost layer of the device driver layer 130, and it includes, for example, a virtual robot 133 constituted of a software suite for providing interfaces for accessing hardware such as the various sensors and actuators 125-1 to 125-*n* described earlier, a power manger 134 constituted of a software suite mainly for managing switching of power, a device driver manager 135 constituted of a software suite for managing various device drivers, and a designed robot 136 constituted of a software suite for managing mechanism of the robot apparatus 100.

A manager object 137 includes an object manger 138 and a service manager 139. The object manager 138 is a software suite for managing activation and deactivation of software suites included in the robotic server object 132, a middleware layer 140, and an application layer 141. The service manger 139 is a software suite for managing connections among objects based on information regarding connections among objects, described in a connection file stored in the memory card 128 (refer to FIG. 4).

The middleware layer 140 resides immediately above the robotic server object 132, and it is constituted of a software suite for providing basic functions of the robot apparatus 100 according to this embodiment, such as image processing and audio processing. The application layer resides immediately above the middleware layer 40, and it is constituted of a software suite for determining actions of the robot apparatus 100 based on results of processing by the software suites constituting the middleware layer 140.

Figure 6:
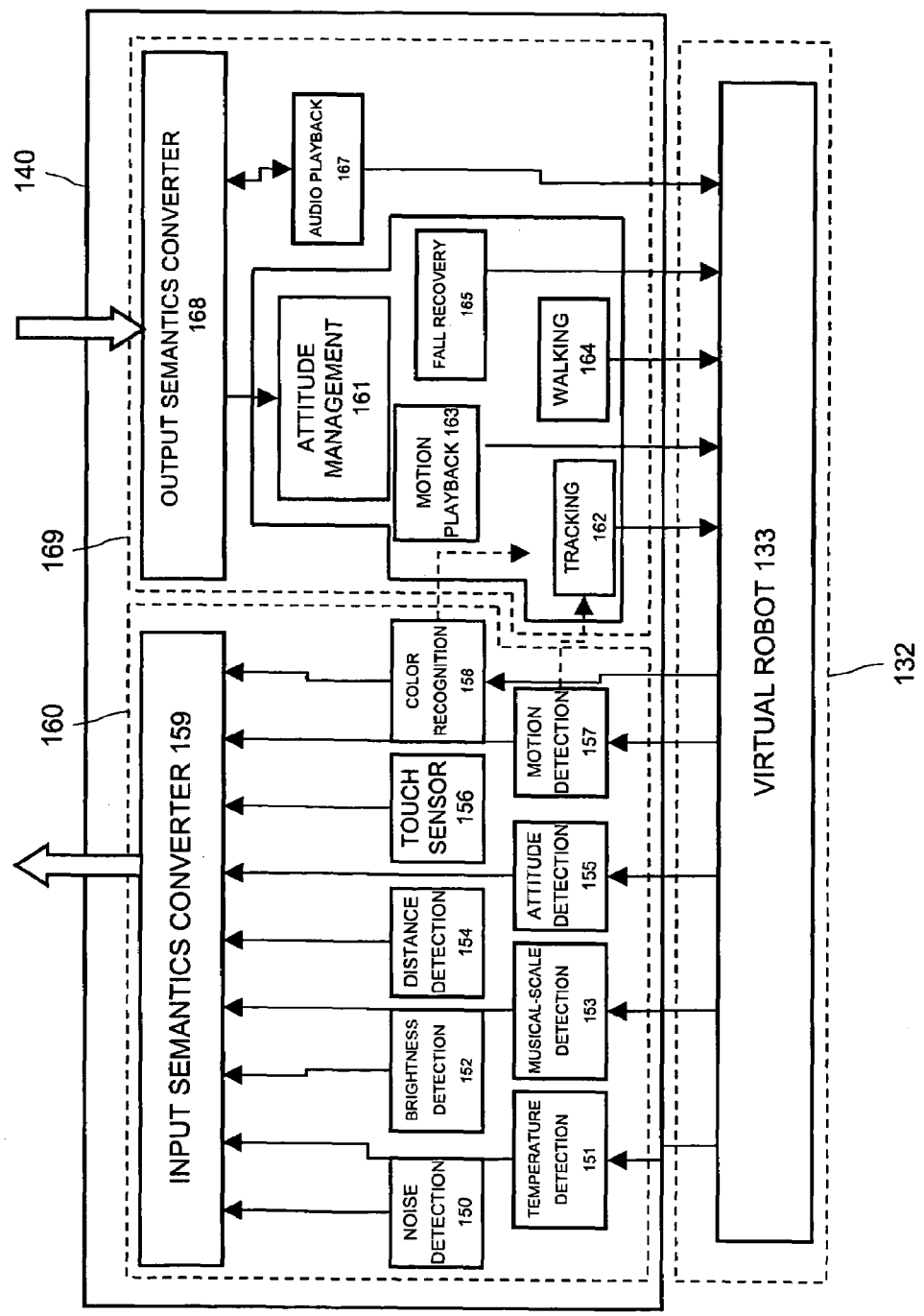
FIG. 6 is a diagram showing a specific software configuration of a middleware layer 140 in detail.

FIG. 6 shows a specific software configuration of the middleware layer 140 in detail.

As shown in the figure, the middleware layer 140 includes recognition-system middleware 160 including signal processing modules 150 to 158 for noise detection, temperature detection, brightness detection, musical-scale detection, distance detection, attitude detection, touch sensor, motion detection, and color recognition, respectively, and including an input semantics converter module 159. The middleware layer 140 also includes output-system middleware 169 including an output semantics converter module 168, and including signal processing modules 161 to 167 for attitude management, tracking, motion playback, walking, fall recovery, and audio playback, respectively.

The signal processing modules 150 to 158 of the recognition-system middleware 160 respectively capture associated data from sensor data, image data (face image data), and audio data read from the DRAM 11 (refer to FIG. 4) by the virtual robot 133 of the robotic server object 132, executes predetermined processing based on the data, and supplies results of the processing to the input semantics converter module 159. The virtual robot 133 is implemented, for example, so as to exchange or convert signals based on a predetermined communication protocol.

Based on the results of processing, supplied from the signal processing modules 150 to 158, the input semantics converter module 159 recognizes its own status or circumstances, such as "noisy", "hot", "bright", "ball detected", "fall detected" "stroked", "struck", "musical scales of do, mi, and sol heard", "moving object detected", "obstacle detected", or "person A found (recognized)", and recognizes instructions and operations by a user, outputting recognition results to the application layer 141.

Figure 7:
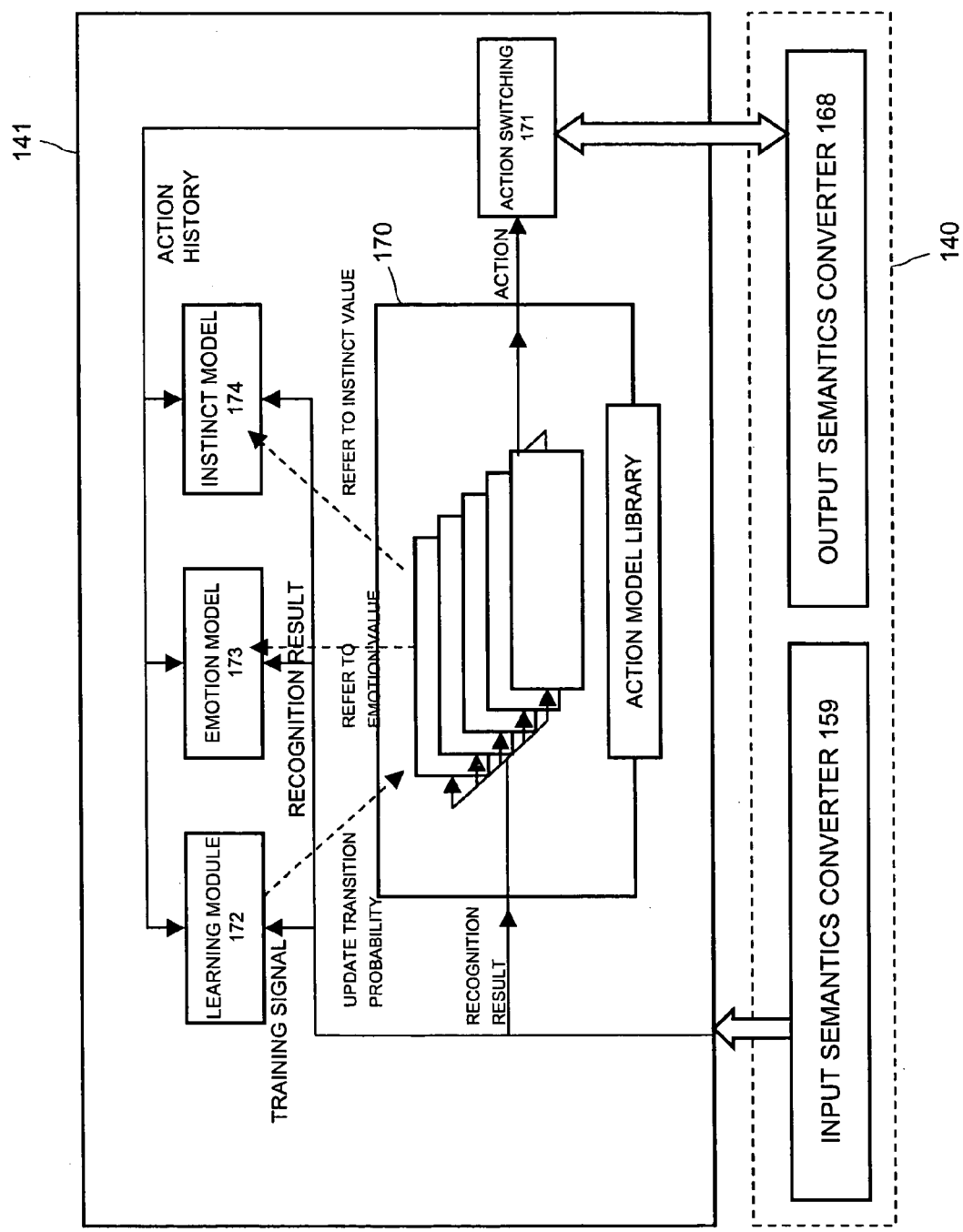
FIG. 7 is a diagram showing a specific software configuration of an application layer 141 in detail.

FIG. 7 shows a specific software configuration of the application layer 141 in detail. As shown in the figure, the application layer 141 includes five modules, namely, an action model library 170, an action switching module 171, a learning module 172, an emotion model 173, and an instinct model 174.

Figure 8:
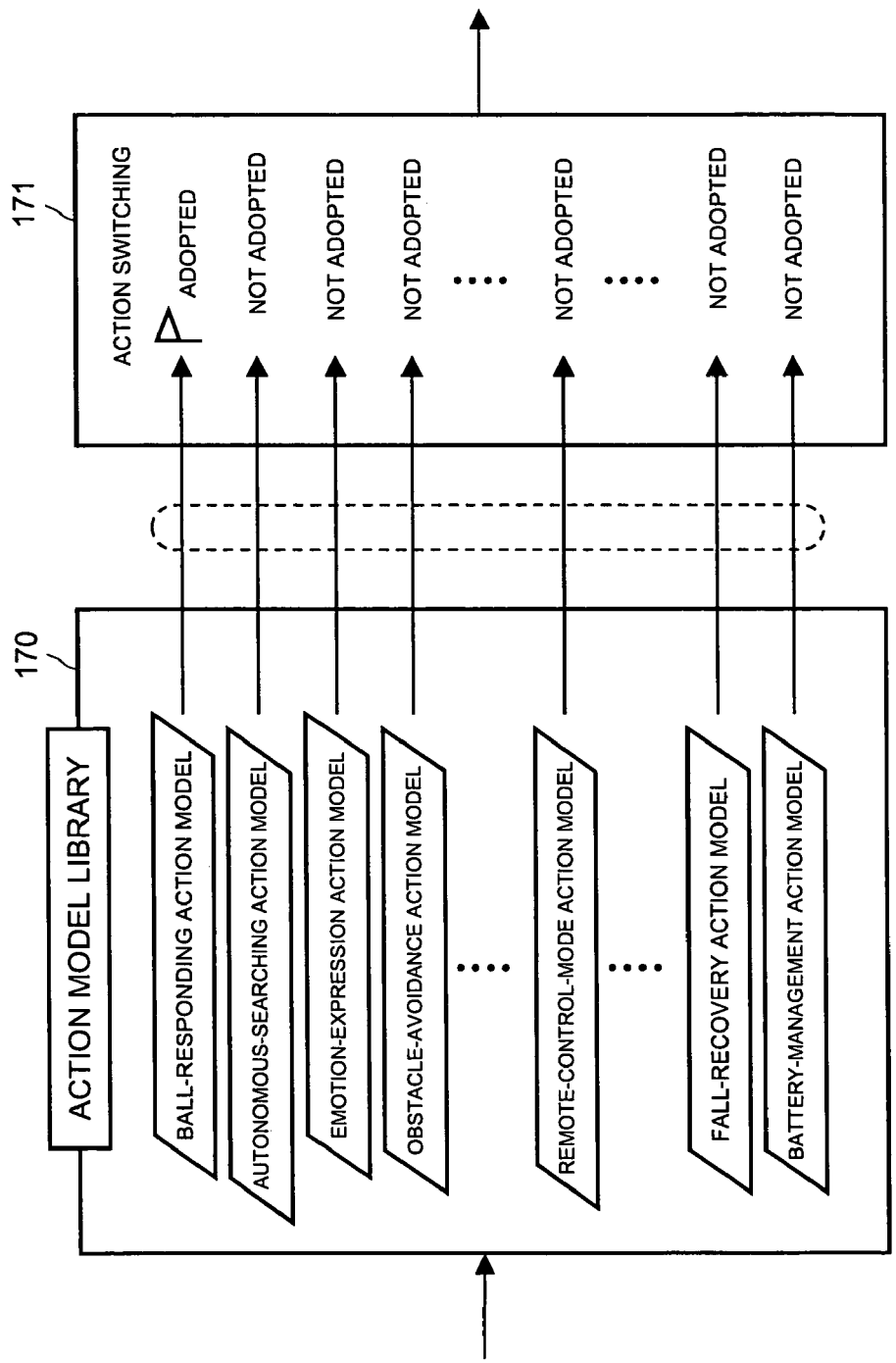
FIG. 8 is a diagram showing a specific software configuration of an action model library 170 in detail.

FIG. 8 shows a specific software configuration of the action model library 170. As shown in the figure, the action model library 170 includes action models 170-1 to 170-*n* independent of each other, respectively associated with a number of pre-selected conditions, such as "remaining battery capacity is small", "recovering from fall", "avoiding obstacle", "expressing emotion", "ball detected", and "person A found (recognized)".

Each of the action models 170-1 to 170-*n*, upon receiving a recognition result from the input semantics converter module 159 or when a predetermined time has elapsed since last reception of a recognition result, determines a subsequent action with reference, as required, to a relevant emotion-parameter value stored in the emotion model 173 and a relevant desire-parameter value stored in the instinct model 174, as will be described later, outputting a result of determination to the action switching module 171.

Figure 9:
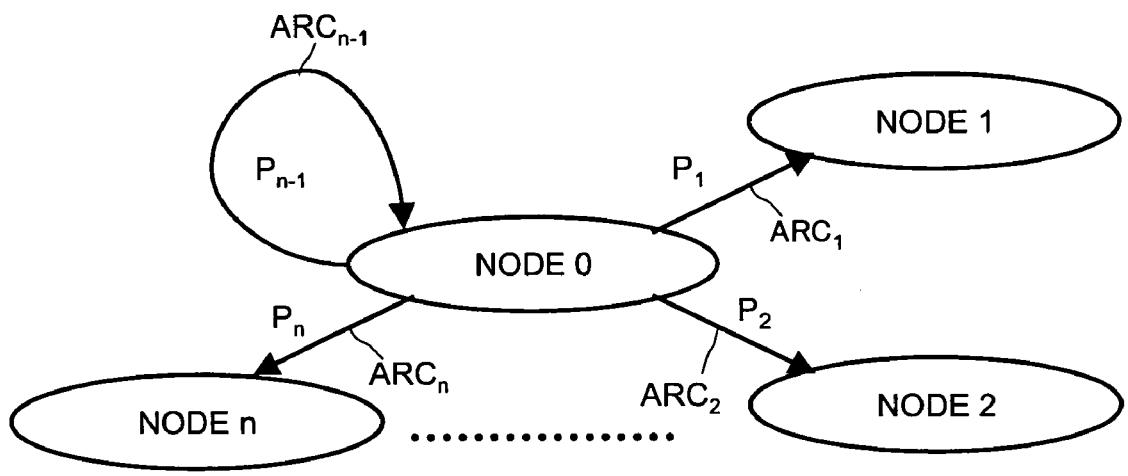
FIG. 9 is a diagram showing the principle of finite-probability automaton for determining subsequent actions based on action models 170-1 to 170-n.

In this embodiment, the action models 170-1 to 170-*n* determine subsequent actions based on an algorithm called finite-probability automaton, shown in FIG. 9. As shown in the figure, according to finite-probability automaton, the destination of a transition from a node among nodes (states) NODE0 to NODEn to another node among the nodes NODE0 to NODEn can be probabilistically determined based on transition probabilities P1 to Pn that are set respectively for arcs ARC1 to ARCn interconnecting the nodes NODE0 to NODEn.

More specifically, the action models 170-1 to 170-*n* have state transition tables 180, such as the one shown in FIG. 10, respectively associated with the nodes NODE0 to NODEn constituting the own action model 170-1 to 170-*n*.

In the state transition tables 180, input events (recognition results) that serve as conditions for transition at the nodes NODE0 to NODEn are listed in order of priority on a row of "input-event name", and further conditions regarding the conditions for transition are prescribed in the associated columns on rows of "data name" and "data range".

For example, at the node NODE100, represented in the state transition table 180 shown in FIG. 10, when a recognition result indicating "ball detected (BALL)" is given, a condition for transition to another node is that the "size (SIZE)" of the ball, given together with the recognition result, is in a range of "0 to 1,000". Similarly, if a recognition result indicating "obstacle detected (OBSTACLE)" is given, a condition for transition to another node is that the "distance (DISTANCE)" to the obstacle, given together with the recognition result, is in a range of "0 to 100".

Even if no recognition result is input, the node NODE100 is allowed to transit to another node if one of the parameter values of "joy (JOY)", "surprise (SURPRISE)", and sadness (SUDNESS)" among the emotion and desire parameter values stored respectively in the emotion model 173 and the instinct model 174 periodically referred to by the action models 170-1 to 170-*n* is in a range of "50 to 100".

Furthermore, in the state transition tables 180, names of nodes to which the nodes NODE0 to NODEn are allowed to transit are listed in a column of "transition destination node" in a section of "probabilities of transition to other nodes", and probabilities of transition to other nodes NODE0 to NODEn that are allowed to be destinations of transitions when all the conditions in the rows of "input-event name", "data value", and "data range" are satisfied are prescribed in corresponding parts of the section of "probabilities of transition to other nodes", and actions to be output in transition to other nodes NODE0 to NODEn are prescribed in a row of "output action" in the section of "probabilities of transition to other nodes". The sum of probabilities in each row of the section of "probabilities of transition to other nodes" is 100[%].

Thus, at the node NODE100 represented in the state transition table 180 shown in FIG. 10, for example, if a recognition result indicating "ball detected (BALL)" and "SIZE (size)" of the ball is in a range of "0 to 1,000" is given, a transition to the "node NODE120 (node 120)" occurs with a probability of "30[%]", in which case an action of "ACTION1" is output, that is, performed by the apparatus.

The action models 170-1 to 170-n are respectively defined as chains of the nodes NODE0 to NODEn as prescribed in the state transition tables 180. Thus, for example, when a recognition result is given from the input semantics converter module 159, a subsequent action is probabilistically determined based on the state transition table of the relevant one of the nodes NODE0 to NODEn, outputting a result of determination to the action switching module 171. Furthermore, by providing an entry with an input-event name of "person A found (recognized)" and prescribing a condition for transition and the like in the state transition table shown in FIG. 10, it is possible to dictate a reaction to be taken when the robot apparatus 100 recognizes a particular user.

From actions respectively output from the action models 170-1 to 170-n of the action model library 170, the action switching module 171 shown in FIG. 7 selects an action output by one of the action models 170-1 to 170-n having a high order of priority as determined in advance, and transmits a command for executing the action (hereinafter referred to as an "action command") to the output semantics converter module 168 of the middleware layer 140. In this embodiment, the action models 170-1 to 170-n have higher orders of priority as they go down in FIG. 8.

Furthermore, based on action-completion information given from the output semantics converter module 168 after completion of an action, the action switching module 171 notifies the learning module 172, the emotion model 173, and the instinct model 174 of completion of the action.

Of recognition results given by the input semantics converter module 159, the learning module 172 receives input of a result of recognition of teaching, such as "struck" or "stroked", received through an operation by a user.

Based on the recognition result and notification by the action switching module 171, the learning module 172 modifies a relevant transition probability of a relevant one of the action models 170-1 to 170-n so as to reduce the probability of occurrence of the action when "struck (scolded)" while raising the probability of occurrence of the action when "stroked (praised)".

The emotion model 173 holds parameters representing intensities of six emotions in total, namely, "joy", "sadness", "anger", "surprise", "disgust", and "fear", respectively. The emotion model 173 periodically updates parameter values of the respective emotions based on particular recognition results, such as "struck" and "stroked", given by the input semantics converter module 159, an elapsed time, notifications by the action switching module 171, etc.

More specifically, let $\Delta E[t]$ denote an amount of variation in an emotion at that time, calculated according to a predetermined formula based on a recognition result given by the input semantics converter module 159, an action of the robot apparatus 100 at that time, a time elapsed since last updating, etc., let E[t] denote a current parameter value of the emotion, and let ke denote a coefficient representing sensitivity of the emotion, then the emotion model 173 calculates a parameter value E[t+1] of the emotion in a next period by equation (1) below, replacing therewith the current parameter value E[t] of the emotion to update the parameter value of the emotion. The emotion model 173 similarly updates parameter values of all the emotions.

$$E[t+1]=E[t]+ke \times \Delta E[t] \quad (1)$$

The extent to which the amount of variation $\Delta E[t]$ of the parameter value of each of the emotions is affected by recognition results and notifications by the output semantics converter module 168 is predetermined. For example, a recognition result indicating "struck" significantly affects the amount of variation $\Delta E[t]$ of the parameter value representing the emotion of "anger". A recognition result indicating "stroked" significantly affects the amount of variation $\Delta E[t]$ of the parameter value representing the emotion of "joy".

The notifications by the output semantics converter module 168 serve as what is known as feedback information of actions (action-completion information), i.e., information representing results of occurrences of actions. The emotion model 173 also changes emotion in accordance with this information. For example, an action of "barking" lowers the level of the emotion of anger. The notifications by the output semantics converter module 168 are also input to the learning module 172 described earlier. The learning module 172 modifies relevant transition probabilities of the action models 170-1 to 170-n based on the notifications.

The feedback of action results may be provided by outputs of the action switching modulator 171 (actions with emotions).

The instinct model 174 holds parameters representing the intensities of four desires independent of each other, namely, "exercise", "affection", "appetite", and "curiosity". The instinct model 174 periodically updates parameter values of the desires based on recognition results given by the input semantics converter module 159, an elapsed time, notifications by the action switching module 171, etc.

More specifically, with regard to "exercise", "affection", and "curiosity", the instinct model 174 uses equation (2) below, in which $\Delta I[k]$ denotes an amount of variation in a relevant desire at that time, calculated according to a predetermined formula based on recognition results, an elapsed time, and notifications by the output semantics converter module 168, etc., I[k] denotes a current parameter value of the desire, and ki denotes a coefficient indicating sensitivity of the desire, to calculate a parameter value I[k+1] of the desire in a next period, replacing the current parameter value I[k] of the desire with the calculation result to update the parameter value of the desire. The instinct model similarly updates parameter values of all the desires except for "appetite".

$$I[k+1]=I[k]+ki \times \Delta I[k] \quad (2)$$

The extent to which the amount of variation $\Delta I[k]$ of each of the desires is affected by recognition results, notifications by the output semantics converter module 168, etc. is predetermined. For example, notifications by the output semantics converter module 168 significantly affect the amount of variation $\Delta I[k]$ of the parameter value representing "fatigue".

In this embodiment, each of the parameter values of the emotions and desires (instincts) is restricted to vary within a range of 0 to 100, and values of coefficients ke and ki are set individually for the emotions and desires.

The output semantics converter module 168 of the middleware layer 140 supplies an abstract action command such as "progress", "joy", "voice", or "track (track a ball)", given from the action switching module 171 of the application layer 141 as described above, to the relevant signal processing modules 161 to 167 in the output-system semantics converter module 169.

Then, the signal processing modules 161 to 167, upon receiving an action command, generates driving data such as a servo command value to be given to the relevant one of the actuators 125-1 to 125-n (refer to FIG. 4) for performing the action or audio data of a sound to be output from the speaker 124 based on the action command, and sequentially forwards the data to the relevant actuators 125-1 to 125-n or the speaker 124 via the virtual robot 133 of the robotic server object 132 and the signal processing circuit 114.

As described above, the robot apparatus 100 is arranged to autonomously behave according to the control program in accordance with its own (internal) status and (external) circumstances and instructions and operations by a user.

C. Face Recognition by the Robot Apparatus

An intelligent robot apparatus requires human interface techniques that allow response within a predetermined time under a dynamically changing operating environment. The robot apparatus 100 according to this embodiment, by using face recognition techniques, allows discriminating a user (owner, friend, or legitimate user) from among many, and controls reactions based on results of recognition (i.e., depending on users), achieving a higher level of entertainment.

A face recognition system 1000 according to this embodiment, which is able to respond within a predetermined time under a dynamically changing environment, includes a face-extraction processing section 1001 for extracting a face pattern from an image captured by a CCD camera, and a face recognition section 1002 for recognizing a face based on the extracted face pattern. In this embodiment, "Gabor filtering", in which a plurality of filters that have orientation selectivity and that are associated with different frequency components are used to extract features of a face image, is employed for face-extraction processing for extracting a face pattern (extracting features of a face image). In face recognition processing for recognizing a face from the face pattern, a support vector machine (SVM) is used, in which a non-linear mapping is performed using a kernel function and a hyperplane that separates in a feature space after the mapping is obtained, thereby discriminating a particular face from other faces.

The face recognition system 1000 has a learning stage in which the face recognition section learns a face pattern, and a recognition stage in which a face pattern extracted from a captured image is recognized based on learned data.

Figure 11:
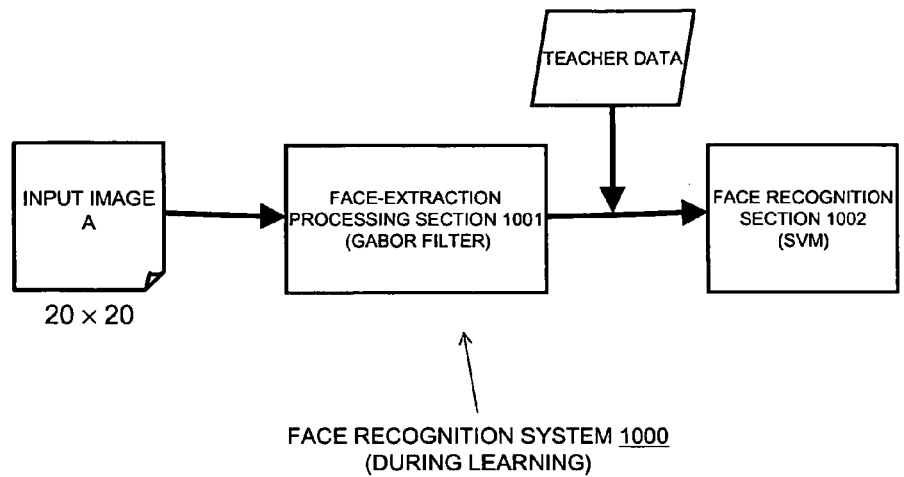
FIG. 11 is a block diagram showing the functional configuration of a face recognition system 1000 according to the embodiment in a learning stage.
Figure 12:
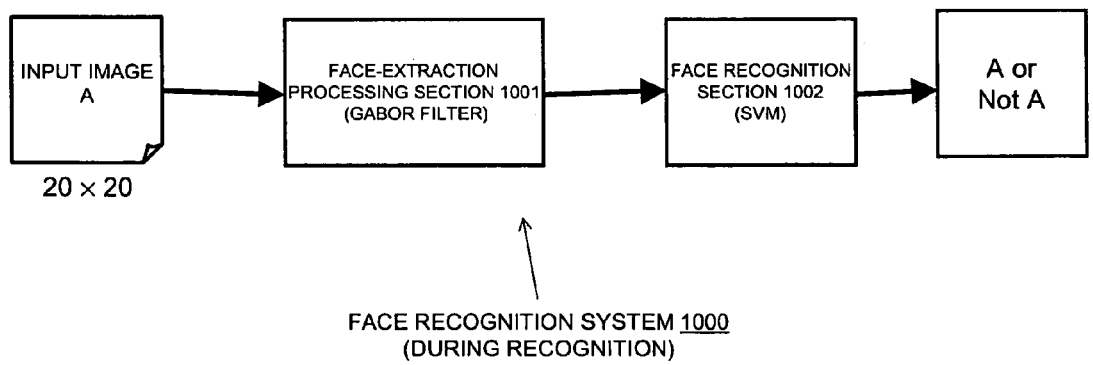
FIG. 12 is a block diagram showing the functional configuration of the face recognition system 1000 according to the embodiment in a recognition stage.
Figure 13:
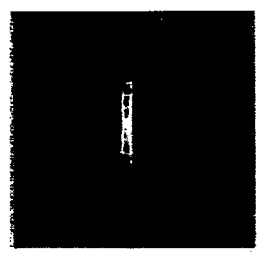
FIG. 13 is a diagram showing spatial-domain characteristics of a Gabor filter used in the embodiment.
Figure 14:
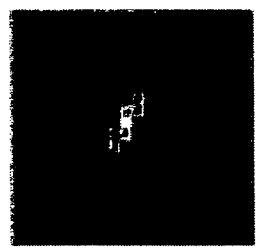
FIG. 14 is a diagram showing spatial-domain characteristics of a Gabor filter used in the embodiment.
Figure 15:
FIG. 15 is a diagram showing spatial-domain characteristics of a Gabor filter used in the embodiment.
Figure 16:
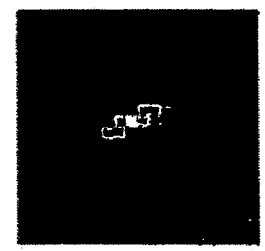
FIG. 16 is a diagram showing spatial-domain characteristics of a Gabor filter used in the embodiment.
Figure 17:
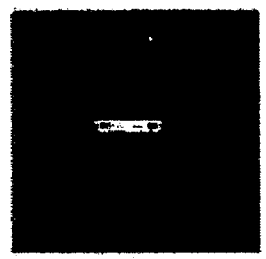
FIG. 17 is a diagram showing spatial-domain characteristics of a Gabor filter used in the embodiment.
Figure 18:
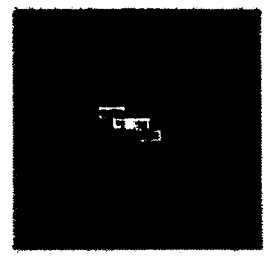
FIG. 18 is a diagram showing spatial-domain characteristics of a Gabor filter used in the embodiment.
Figure 19:
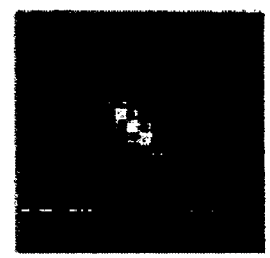
FIG. 19 is a diagram showing spatial-domain characteristics of a Gabor filter used in the embodiment.
Figure 20:
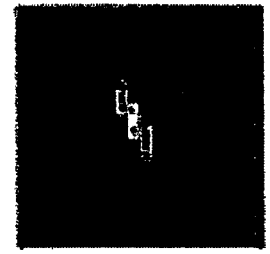
FIG. 20 is a diagram showing spatial-domain characteristics of a Gabor filter used in the embodiment.
Figure 21:
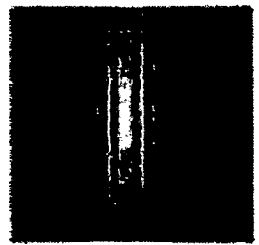
FIG. 21 is a diagram showing spatial-domain characteristics of a Gabor filter used in the embodiment.
Figure 22:
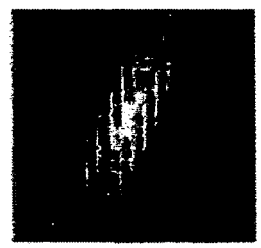
FIG. 22 is a diagram showing spatial-domain characteristics of a Gabor filter used in the embodiment.
Figure 23:
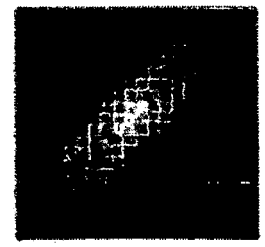
FIG. 23 is a diagram showing spatial-domain characteristics of a Gabor filter used in the embodiment.
Figure 24:
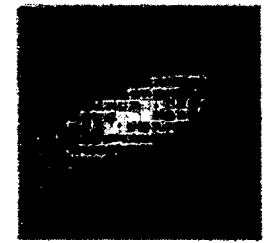
FIG. 24 is a diagram showing spatial-domain characteristics of a Gabor filter used in the embodiment.
Figure 25:
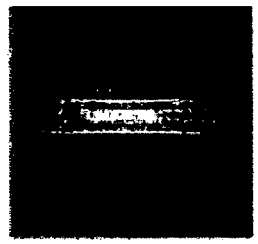
FIG. 25 is a diagram showing spatial-domain characteristics of a Gabor filter used in the embodiment.
Figure 26:
FIG. 26 is a diagram showing spatial-domain characteristics of a Gabor filter used in the embodiment.
Figure 27:
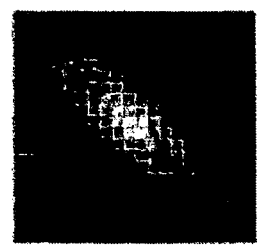
FIG. 27 is a diagram showing spatial-domain characteristics of a Gabor filter used in the embodiment.
Figure 28:
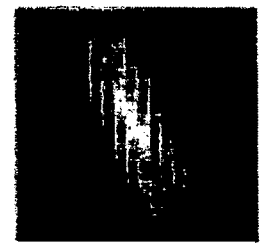
FIG. 28 is a diagram showing spatial-domain characteristics of a Gabor filter used in the embodiment.
Figure 29:
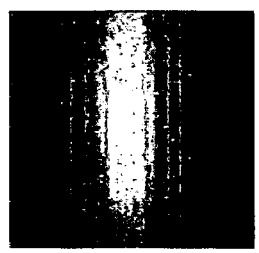
FIG. 29 is a diagram showing spatial-domain characteristics of a Gabor filter used in the embodiment.
Figure 30:
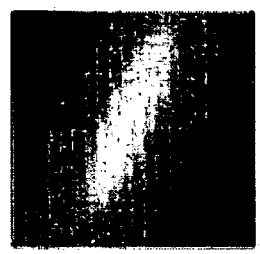
FIG. 30 is a diagram showing spatial-domain characteristics of a Gabor filter used in the embodiment.
Figure 31:
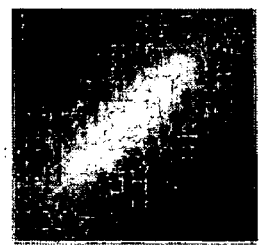
FIG. 31 is a diagram showing spatial-domain characteristics of a Gabor filter used in the embodiment.
Figure 32:
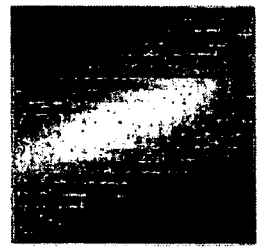
FIG. 32 is a diagram showing spatial-domain characteristics of a Gabor filter used in the embodiment.
Figure 33:
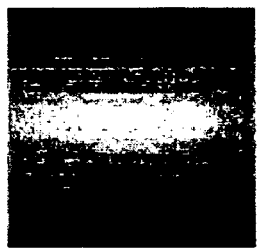
FIG. 33 is a diagram showing spatial-domain characteristics of a Gabor filter used in the embodiment.
Figure 34:
FIG. 34 is a diagram showing spatial-domain characteristics of a Gabor filter used in the embodiment.
Figure 35:
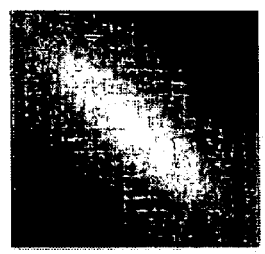
FIG. 35 is a diagram showing spatial-domain characteristics of a Gabor filter used in the embodiment.
Figure 36:
FIG. 36 is a diagram showing spatial-domain characteristics of a Gabor filter used in the embodiment.

FIG. 11 shows the configuration of the learning stage of the face recognition system 1000 according to this embodiment, and FIG. 12 shows the configuration of the recognition stage of the face recognition system 1000.

As shown in FIG. 11, in the learning stage, a face is extracted by Gabor filtering 1001 from a captured image of a user, input from a CCD camera, and the result is thrown into a support vector machine 1002. The support vector machine 1002 obtains a provisional discriminating function using externally supplied data for learning, i.e., teacher data. As shown in FIG. 12, in the recognition stage, a face is extracted by Gabor filtering 1001 from a captured image of a user, input from a CCD camera, and the result is thrown into the support vector machine 1002. The support vector machine 1002 tries the provisional discriminating function on various images in a database to detect a face. A face that has successfully detected is output as face data. Faces that failed in detection are added to leaning data as non-face data, and learning is performed again.

The Gabor filtering and the support vector machine will be described below in detail.

Gabor Filtering

It has been found that some human visual cells have selectivity to particular orientations. Such cells include cells that ignite in response to vertical lines and cells that respond to horizontal lines. Similarly, Gabor filtering is spatial filtering implemented by a plurality of filters that have orientation selectivity.

A Gabor filter is spatially represented by a Gabor function. A Gabor function $g(x, y)$ includes a carrier $s(x, y)$ composed of cosine components and an envelope $w_r(x, y)$ having a two-dimensional Gaussian distribution, as expressed in equation (3) below.

$$g(x,y)=s(x,y)w_r(x,y) \qquad (3)$$

The carrier $s(x, y)$ is represented by equation (4) below using a complex function, where a coordinate value $(u_0, v_0)$ denotes a spatial frequency and P denotes a phase of cosine components.

$$s(x,y)=\exp(j(2\pi(u_0x+v_0y)+P)) \qquad (4)$$

The carrier expressed by equation (4) above can be separated into a real component $Re(s(x, y))$ and an imaginary component $Im(s(x, y))$, as expressed in equation (5) below.

$$Re(s(x,y))=\cos(2\pi(u_0x+v_0y)+P)$$

$$Im(s(x,y))=\sin(2\pi(u_0x+v_0y)+P) \qquad (5)$$

The envelope having a two-dimensional Gaussian distribution is expressed as equation (6) below.

$$w_r(x,y)=K\exp(-\pi(a^2(x-x_0)_r^2+b^2(y-y_0)_r^2)) \qquad (6)$$

The coordinate value $(x_0, y_0)$ corresponds to a peak of the function, and constants a and b are scale parameters of the Gaussian distribution. The index r denotes a rotational operation expressed in equation (7) below.

$$(x-x_0)_r=(x-x_0)\cos\theta+(y-y_0)\sin\theta$$

$$(y-y_0)_r=-(x-x_0)\sin\theta+(y-y_0)\cos\theta \qquad (7)$$

From equations (4) and (6) above, the Gabor filter is expressed as a spatial function expressed in equation (8) below.

$$g(x,y)=K\exp(-\pi(a^2(x-x_0)_r^2+b^2(y-y_0)_r^2))\exp(j(2\pi(u_0x+v_0y)+P)) \qquad (8)$$

The face extracting section 1001 in this embodiment employs eight directions and three frequencies to execute face-extraction processing using 24 Gabor filters in total. FIGS. 13 to 36 show spatial-domain characteristics of the Gabor filters used in this embodiment. Of the figures, FIGS. 13 to 20 show Gabor filters associated with high-frequency components, in which direction is varied by increments of 22.5°. FIGS. 21 to 28 show Gabor filters associated with mid-frequency components, in which direction is varied by increments of 22.5°. FIGS. 29 to 36 show Gabor filters associated with low-frequency components, in which direction is varied by increments of 22.5°. It is to be understood that shading in the figures indicates components in the direction of a coordinate axis that is perpendicular to the sheets.

The response of the Gabor filters is expressed by equation (9) below, where Gi denotes an i-th Gabor filter, Ji denotes a result of the i-th Gabor (Gabor Jet), and I denotes an input image. The calculation of equation (9) can be actually executed quickly using fast Fourier transform.

$$J_i(x,y) = G_i(x,y) \otimes I(x,y) \quad (9)$$

Figure 37:
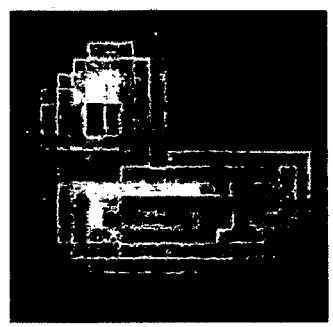
FIG. 37 is a diagram showing an example of input image.
Figure 38:
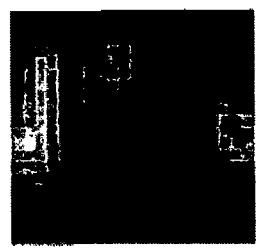
FIG. 38 is a result of filtering the input image shown in FIG. 37 by the Gabor filter shown in FIG. 13.
Figure 39:
FIG. 39 is a result of filtering the input image shown in FIG. 37 by the Gabor filter shown in FIG. 14.
Figure 40:
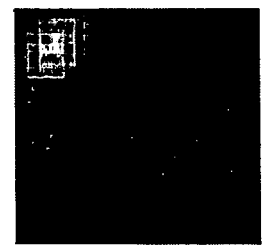
FIG. 40 is a result of filtering the input image shown in FIG. 37 by the Gabor filter shown in FIG. 15.
Figure 41:
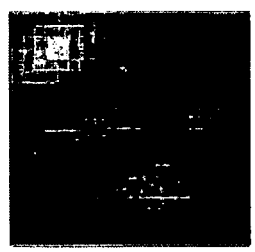
FIG. 41 is a result of filtering the input image shown in FIG. 37 by the Gabor filter shown in FIG. 16.
Figure 42:
FIG. 42 is a result of filtering the input image shown in FIG. 37 by the Gabor filter shown in FIG. 17.
Figure 43:
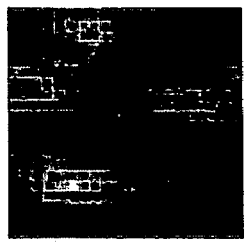
FIG. 43 is a result of filtering the input image shown in FIG. 37 by the Gabor filter shown in FIG. 18.
Figure 44:
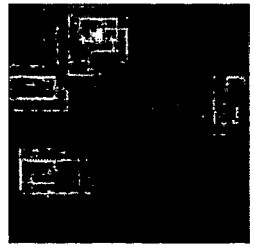
FIG. 44 is a result of filtering the input image shown in FIG. 37 by the Gabor filter shown in FIG. 19.
Figure 45:
FIG. 45 is a result of filtering the input image shown in FIG. 37 by the Gabor filter shown in FIG. 20.
Figure 46:
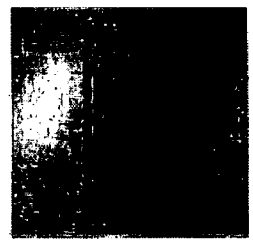
FIG. 46 is a result of filtering the input image shown in FIG. 37 by the Gabor filter shown in FIG. 21.
Figure 47:
FIG. 47 is a result of filtering the input image shown in FIG. 37 by the Gabor filter shown in FIG. 22.
Figure 48:
FIG. 48 is a result of filtering the input image shown in FIG. 37 by the Gabor filter shown in FIG. 23.
Figure 49:
FIG. 49 is a result of filtering the input image shown in FIG. 37 by the Gabor filter shown in FIG. 24.
Figure 50:
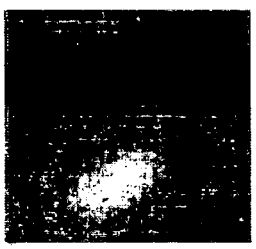
FIG. 50 is a result of filtering the input image shown in FIG. 37 by the Gabor filter shown in FIG. 25.
Figure 51:
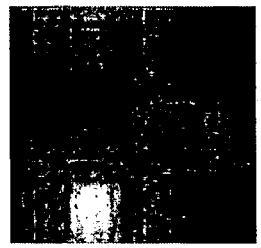
FIG. 51 is a result of filtering the input image shown in FIG. 37 by the Gabor filter shown in FIG. 26.
Figure 52:
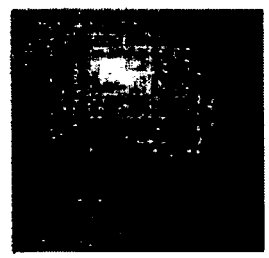
FIG. 52 is a result of filtering the input image shown in FIG. 37 by the Gabor filter shown in FIG. 27.
Figure 53:
FIG. 53 is a result of filtering the input image shown in FIG. 37 by the Gabor filter shown in FIG. 28.
Figure 54:
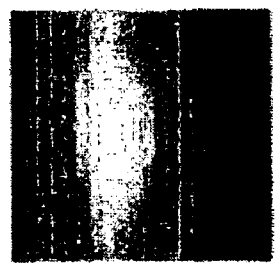
FIG. 54 is a result of filtering the input image shown in FIG. 37 by the Gabor filter shown in FIG. 29.
Figure 55:
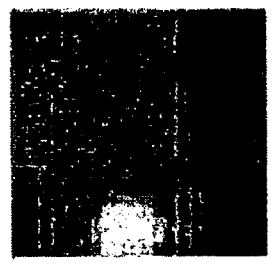
FIG. 55 is a result of filtering the input image shown in FIG. 37 by the Gabor filter shown in FIG. 30.
Figure 56:
FIG. 56 is a result of filtering the input image shown in FIG. 37 by the Gabor filter shown in FIG. 31.
Figure 57:
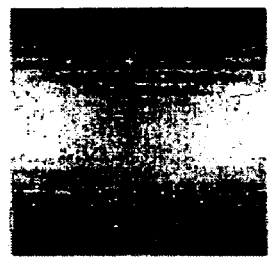
FIG. 57 is a result of filtering the input image shown in FIG. 37 by the Gabor filter shown in FIG. 32.
Figure 58:
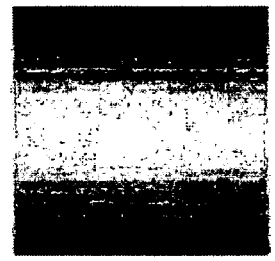
FIG. 58 is a result of filtering the input image shown in FIG. 37 by the Gabor filter shown in FIG. 33.
Figure 59:
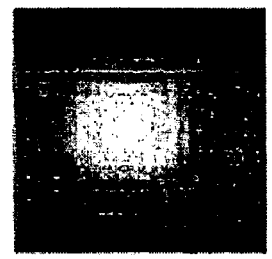
FIG. 59 is a result of filtering the input image shown in FIG. 37 by the Gabor filter shown in FIG. 34.
Figure 60:
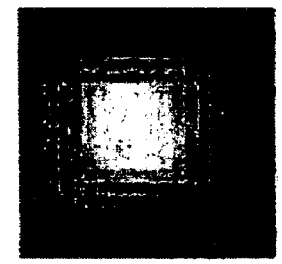
FIG. 60 is a result of filtering the input image shown in FIG. 37 by the Gabor filter shown in FIG. 35.
Figure 61:
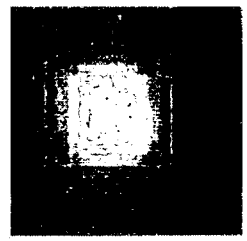
FIG. 61 is a result of filtering the input image shown in FIG. 37 by the Gabor filter shown in FIG. 36.

FIGS. 38 to 61 show results of filtering an input image (the input image has 20×20 pixels) shown in FIG. 37 by Gabor filters shown in FIGS. 13 to 36, respectively. The Gabor filters cover substantially all frequencies.

Performance of the Gabor filters prepared is tested by reconstructing filtered images. The reconstructed images H are expressed by equation (10) below.

$$H(x, y) = \sum_{i=1}^{Q} a_i J_i(x, y) \quad (10)$$

An error E of a reconstructed image against the input image I is expressed by equation (11) below.

$$E = \frac{1}{2}\|I(x, y) - H(x, y)\|^2 = \frac{1}{2}\sum_{x,y}(I(x, y) - H(x, y))^2 \quad (11)$$

$$= \frac{1}{2}\sum_{x,y}\left(I(x, y) - \sum_{i=1}^{Q} a_i J_i(x, y)\right)^2$$

$$= \frac{1}{2}\sum_{x,y}\left(I(x, y) - \sum_{i=1}^{Q} a_i G_i \otimes I\right)^2$$

Reconstruction is allowed by obtaining an optimal a that minimizes the error E.

Support Vector Machine

In this embodiment, with regard to face recognition, a target face is discriminated from other faces using a support vector machine (SVM), which is known as best with respect to the ability of generalization in learning in the field of pattern recognition.

SVM itself is described, for example, in a report by B. Sholkopf, et. al. (B. Sholkopf, C. Burges, A. Smola, "Advance in Kernel Methods Support Vector Learning", The MIT Press, 1999) is known. Results of preliminary experiments by the inventors of the present invention demonstrate that face recognition based on SVM achieves better results than methods based on principal component analysis (PCA) or neural network.

SVM is a learning machine that uses a linear discriminator (perceptron) as a discriminating function, and can be extended to a non-linear space by using a kernel function. The discriminating function is learned by maximizing a margin for separating classes, and a solution is obtained by solving a two-dimensional mathematical planning problem, which theoretically assures that a global solution can be found.

Usually, a problem of pattern recognition is reduced to calculation of a discriminating function f(x) below for a test sample x=(x1, x2, . . . , xn).

$$f(x) = \sum_{j=1}^{n} w_j x_j + b \quad (12)$$

A teacher label for learning by SVM is denoted as follows.

$$y = (y1, y2, \ldots, yn) \quad (13)$$

Then, recognition of a face pattern by SVM can be considered as a problem of minimizing the square of a weighting factor w under the following constraint.

$$y_i(w^T x_i + b) \geq 1 \quad (14)$$

The problem with constraint can be solved by Lagrange's undetermined constant method. First, Lagrange expressed below is introduced.

$$L(w, b, \alpha) = \frac{1}{2}\|w\|^2 - \sum_{i=1}^{i} \alpha_i(y_i((x_i^T w + b) - 1)) \quad (15)$$

Then, partial differentiation is carried out with respect to each of b and w.

$$\frac{\partial L}{\partial b} = \frac{\partial L}{\partial w} = 0 \quad (16)$$

Thus, discrimination of a face pattern by SVM can be considered as a problem of two-dimensional planning as expressed below.

$$\max \sum \alpha i - \frac{1}{2} \sum \alpha i \alpha j y i y j^T x j \quad (17)$$

Constraints $\alpha i \geq 0, \sum \alpha i y i = 0$

If the number of degrees of the feature space is smaller than the number of training samples, the constraints are modified as expressed below by introducing a slack variable $\xi \geq 0$.

$$y_i(w^T x_i + b) \geq 1 - \xi_i \quad (18)$$

Optimization is allowed by minimizing an objective function below.

$$\frac{1}{2}\|w\|^2 + C\sum \xi_i \quad (19)$$

In equation (19) above, C denotes a coefficient that specifies to what extent the constraint is slackened, whose value must be determined experimentally.

$$\max \sum \alpha i - \frac{1}{2} \sum \alpha i \alpha j y i y j^T x j \quad (20)$$

Constraints $0 \leq \alpha i \leq C, \sum \alpha i y i = 0$

Equation (20), however, does not directly allow a non-linear problem to be solved. Thus, in this embodiment, a kernel function K(x, x') is introduced for mapping to a space of a higher dimension (kernel trick), allowing linear separation in that space. This is equivalent to a non-linear separation in the original space.

The kernel function is expressed by the following equation using a mapping Φ.

$$K(x,x') = \Phi(x)^T \Phi(x') \quad (21)$$

The discriminating function expressed in equation (12) can be expressed as below.

$$f(\Phi(x)) = w^T \Phi(x) + b \quad (22)$$

$$= \sum a_i y_i K(x, x_i) + b$$

Furthermore, learning can be considered as a problem of two-dimensional planning as expressed below.

$$\max \sum \alpha i - \frac{1}{2} \sum \alpha i \alpha j y i y j x j K(Xi, xj) \quad (23)$$

Constraints: $0 \le \alpha i \le C, \sum \alpha i y i = 0$

As a kernel, for example, a Gaussian kernel (radius basic function (RBF)) expressed below may be used.

$$K(x, x') = \exp\left(-\frac{|x - x'|^2}{\sigma^2}\right) \quad (24)$$

With regard to Gabor filtering, filter type may be changed depending on recognition tasks.

For filtering at low frequencies, it is redundant to hold all the filtered images in the form of vectors. Thus, the filtered images may be downsampled to reduce dimension of the vectors. The 24 downsampled vectors are arranged in a line to form a long vector.

The SVM used for recognition of a face pattern in this embodiment, which is a discriminator that classifies the feature space into two, performs learning so as to discriminate whether a person is "person A" or "not person A". Thus, first, face images of the person A are collected from images in a database, and a vector obtained by Gabor filtering is labeled as "not person A". Generally, the number of face images is preferably larger than the dimension of the feature space. If faces of ten persons are to be recognized, a discriminator is implemented similarly for each of the persons, such as "person B" and "not person B".

By learning as described above, for example, a support vector that classifies "person A" and "not person A" is obtained. The SVM is a discriminator that classifies the feature space into two, and when a new face image is input, the SVM outputs a recognition result according to which side of the boundary dictated by the support vector a vector of Gabor filtering resides on. If the vector resides in the area of "person A" with respect to the boundary, recognition results in "person A". If the vector resides in the area of "not person A", recognition results in "not person A".

An area that is extracted as a face region from an input image input from a CCD camera or the like is not fixed. Thus, the area might be projected to a point remote from a category that is to be recognized in the feature space. Thus, rate of recognition could be improved by estimating feature parts such as eyes, nose, and mouth and by executing morphing by affine transformation.

Furthermore, a bootstrap method may be used to improve recognition performance. An image is captured separately from an image used for learning, and is used for bootstrap. This indicates that if a discriminator outputs an erroneous recognition result after learning, the input image is thrown into a learning set for learning again.

Furthermore, in order to improve recognition performance, temporal change in recognition results may be monitored. In a simplest method, a person is recognized as "person A" if recognized as "person A" eight times in ten. Other methods have been proposed, including a prediction method based on Kalman filtering.

Other Embodiments

As described above, the face extracting section 1001 may change type of the Gabor filters depending on recognition tasks. More specifically, the type of the Gabor filters herein refers to setting of the number of frequencies and respective values thereof and the number of directions and the respective directions.

In the embodiment described above, Gabor filters having three types of frequency are provided; however, a face image can be recognized with a single frequency. This reduces the amount of computation, although the rate of recognition might be lowered. Reduction in the amount of computation is a significant advantage in an entertainment robot that consumes limited computer resources for a large number of programs including programs for controlling operations and programs for controlling internal status (emotions and instincts).

The robot 100 (refer to FIGS. 1 to 3) having the face recognition system according to the embodiment mounted thereon obtains distance information from stereoscopic views by, for example, two cameras. The Gabor filters can be tuned using the distance information.

Relationship between face sizes and distance can be obtained in advance. Furthermore, a certain relationship exists between sizes of face images and frequencies of Gabor filters. That is, feature extraction must be carried out at a high frequency if a face image is small, while a low frequency suffices if the face image is large.

If an input image is not an extraction of a face region, a region of a face must be determined and identity of the face must be discriminated from the entire image. In that case, a frequency in accordance with distance can be selected based on a distribution of distance images. A result of the above is discriminated by a subsequent support vector machine (SVM, described later).

A procedure of face-extraction processing by Gabor filters using distance information will be described below.

Preparation

Figure 62:
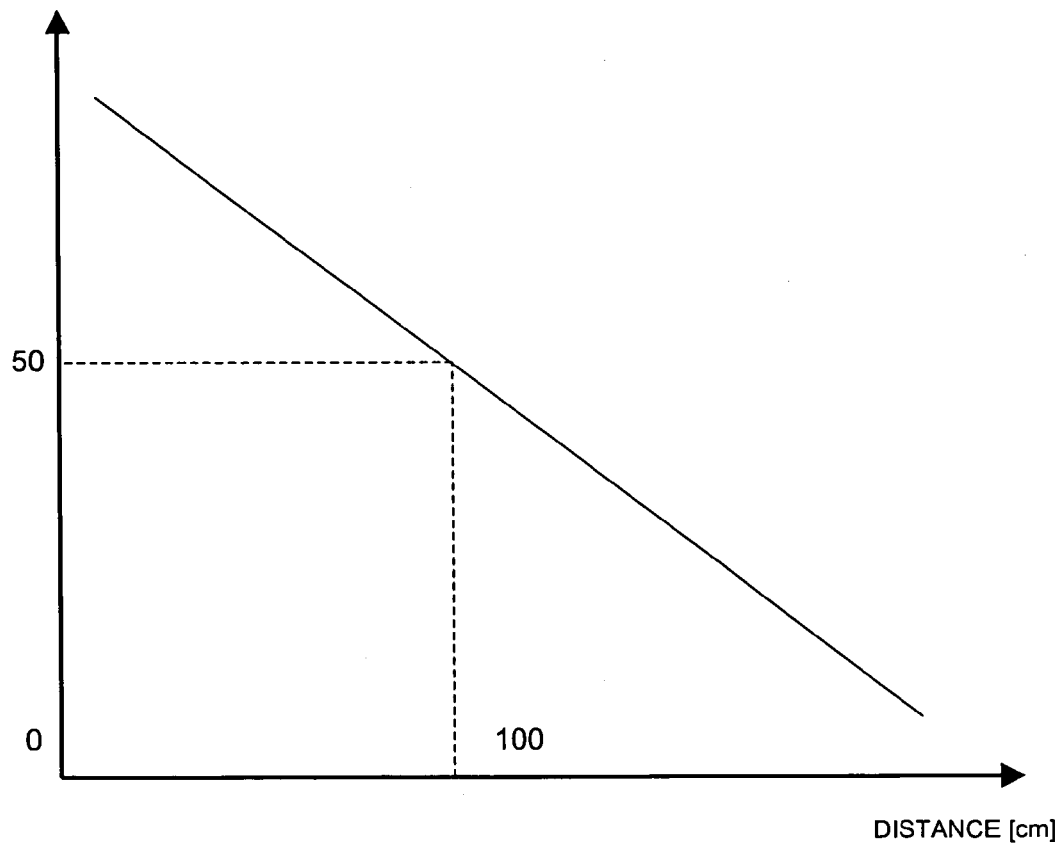
FIG. 62 is a diagram showing relationship between face sizes in images and distance.
Figure 63:
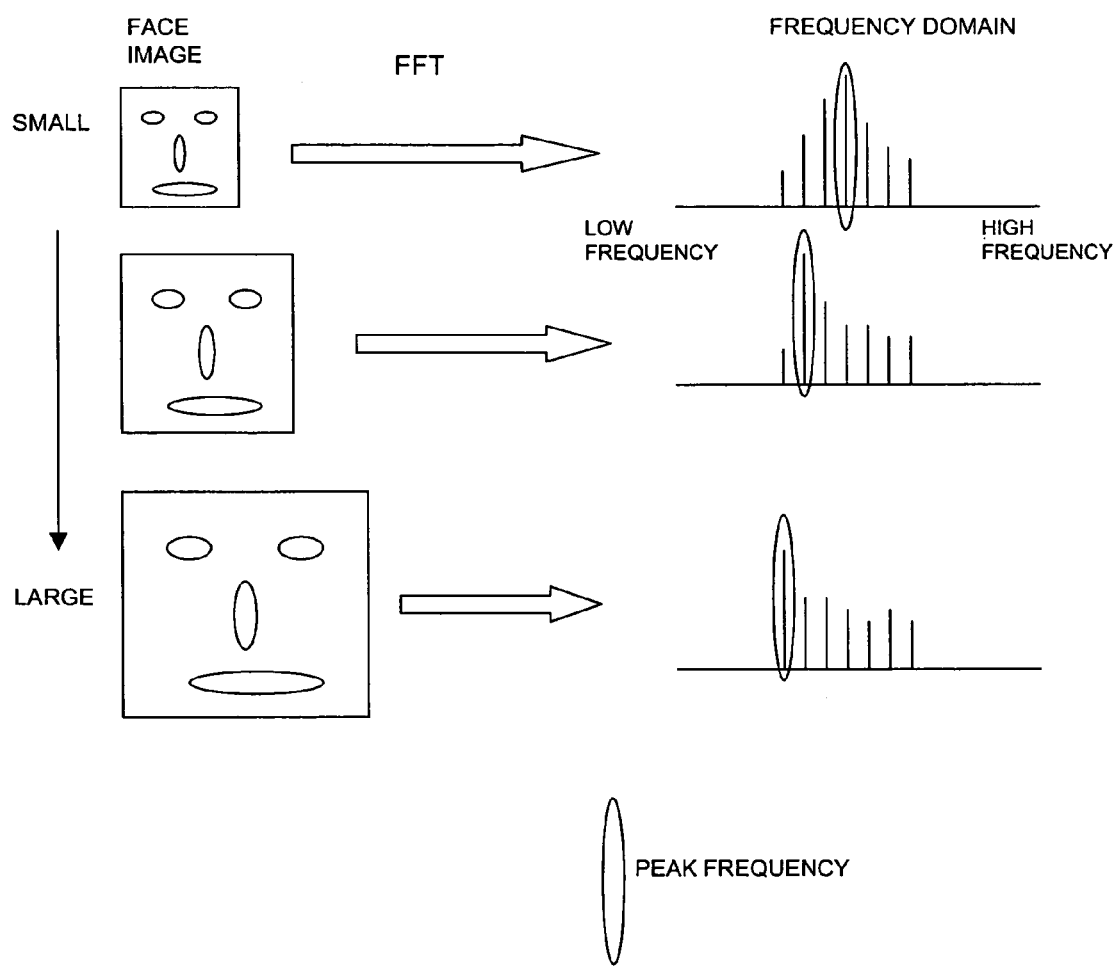
FIG. 63 is a diagram for explaining processing for calculating peaks in the frequency domain by fast Fourier transform of images of respective face sizes.
Figure 64:
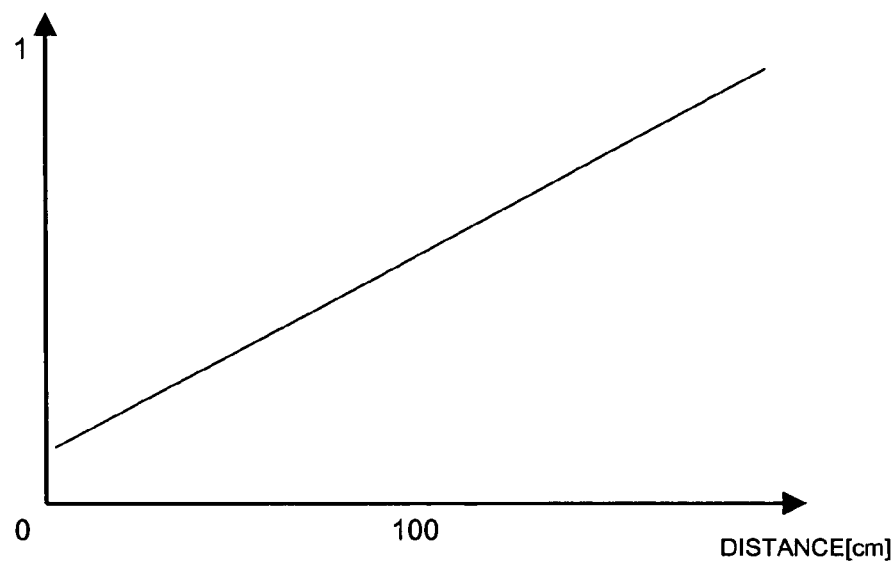
FIG. 64 is a diagram showing relationship between distance and frequency of Gabor filters.

1. Relationship between face sizes (T pixels×T pixels) and distance (M cm) in images is obtained. In FIG. 62, the horizontal axis corresponds to distance and the vertical axis corresponds to the size of a face image. On the vertical axis, each face image is assumed to be a square and the length of a side thereof is represented. For example, an image is captured at a predetermined distance, and the size of a face region in the image is measured by a person.
2. Peaks in the frequency domain are obtained by fast Fourier transform (FFT) of face images of respective sizes (refer to FIG. 63). Face images of various sizes are captured, and peaks in frequency are respectively obtained therefor.
3. Relationship between distance and frequency is obtained (refer to FIG. 64). Based on 1 and 2 above, relationship between distance and frequency, shown in FIG. 64, is obtained.

Figure 65:
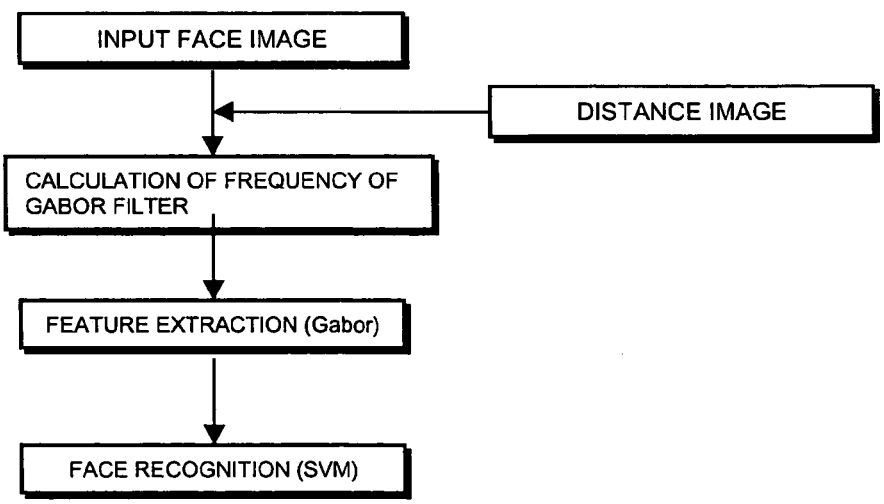
FIG. 65 is a flowchart showing a procedure of face-extraction processing by Gabor filters using distance information.

Recognition (Refer to FIG. 65)
1. Distance is obtained for an image.
   (Three-dimensional coordinate values are determined respectively for pixels in the image.)
2. A frequency is calculated from the distance.
   A frequency is calculated based on the relationship obtained in step 3 of the preparation.
3. A feature is extracted by a Gabor filter associated with the frequency calculated.
4. A resulting image is discriminated by a support vector machine to determine whether the image corresponds to a particular face or not.

Supplement

Although the present invention has been described hereinabove in the context of specific embodiments, it will be readily understood that modifications or alternatives of the embodiments can be made by those skilled in the art without departing from the spirit of the present invention.

The present invention, in its essence, is not necessarily limited to produces referred to as "robots". That is, the present invention may be applied similarly to machine apparatuses that operate in manners that simulate human operations by electric or magnetic effects, even if the products belong to other industrial fields, such as toys.

That is, the present invention has been disclosed by way of examples, and disclosure in this specification should not be construed as limiting. The gist of the present invention must be determined based on the section of claims at the beginning.

INDUSTRIAL APPLICABILITY

According to the present invention, a robot apparatus provided with a human interface that allows response within a predetermined time under a dynamically changing operating environment, and a favorable face recognition method and face recognition apparatus that can be used as a human interface for a robot are provided.

Furthermore, according to the present invention, a favorable robot apparatus, face recognition method, and face recognition apparatus that allow recognition of a face of a user within a predetermined time under a dynamically changing operating environment are provided.

Furthermore, according to the present invention, a favorable robot apparatus, face recognition method, and face recognition apparatus that do not require positioning such as morphing and that allow robust face recognition against rotation, change in position, and the like are provided.

Furthermore, according to the present invention, a favorable robot apparatus, face recognition method, and face recognition apparatus that allow robust face recognition under environments with different lighting conditions and camera parameters are provided.

The invention claimed is:

1. A robot apparatus that operates autonomously, comprising:
   image input means for inputting a face image;
   facial feature extraction means for extracting features of the face image using a set of high frequency Gabor filters, a set of mid-frequency Gabor filters and a set of low frequency Gabor filters, the Gabor filters in each set having respective orientation selectivities that vary by predetermined increments; and
   face discrimination means for discriminating a particular face from other faces and including a support vector machine operable to perform non-linear mapping of said extracted features by using a kernel function, and obtaining a hyperplane that separates the non-linearly mapped features in a feature space;
   wherein said face discrimination means performs learning and when said face discrimination means outputs an erroneous recognition result after learning, said face image is used for learning again.

2. A robot apparatus according to claim 1, wherein the facial feature extraction means comprises filter changing means for changing type of the Gabor filters in accordance with recognition task.

3. A robot apparatus according to claim 1, wherein the facial feature extraction means, in filtering at a low frequency, downsamples a filtered image to reduce dimension of the filtered image.

4. A face recognition apparatus comprising:
   image input means for inputting a face image;
   facial feature extraction means for extracting features of the face image using a set of high frequency Gabor filters, a set of mid-frequency Gabor filters and a set of low frequency Gabor filters, the Gabor filters in each set having respective orientation selectivities that vary by predetermined increments; and
   face discrimination means for discriminating a particular face from other faces and including a support vector machine operable to perform non-linear mapping of said extracted features by using a kernel function, and obtaining a hyperplane that separates the non-linearly mapped features in a feature space;
   wherein said face discrimination means performs learning and when said face discrimination means outputs an erroneous recognition result after learning, said face image is used for learning again.

5. A face recognition apparatus according to claim 4, wherein the facial feature extraction means comprises filter changing means for changing type of the Gabor filters in accordance with recognition task.

6. A face recognition apparatus according to claim 4, wherein the facial feature extraction means, in filtering at a low frequency, downsamples a filtered image to reduce dimension of the filtered image.

7. A face recognition method comprising:
   an image input step of inputting a face image;
   a facial feature extraction step of extracting features of the face image using a set of high frequency Gabor filters, a set of mid-frequency Gabor filters and a set of low frequency Gabor filters, the Gabor filters in each set having respective orientation selectivities that vary by predetermined increments; and
   a face discrimination step of discriminating a particular face from other faces by operating a support vector machine to non-linearly map said extracted features by using a kernel function, and obtaining a hyperplane that separates the non-linearly mapped features in a feature space;
   wherein said face discrimination step performs learning and when said face discrimination step outputs an erroneous recognition result after learning, said face image is used for learning again.

8. A face recognition method according to claim 7, wherein the facial feature extraction step comprises a filter changing step of changing type of the Gabor filters in accordance with recognition task.

9. A face recognition method according to claim 7, wherein, in filtering at a low frequency, a filtered image is downsampled to reduce dimension of the filtered image in the facial feature extraction step.

* * * * *